(12) United States Patent
Schnug et al.

(10) Patent No.: US 9,932,063 B2
(45) Date of Patent: Apr. 3, 2018

(54) VEHICLES AND VEHICLE SYSTEMS FOR RESTRICTING ROTATION OF A VEHICLE STEERING SYSTEM

(71) Applicant: Toyota Motor Engineering & Manufacturing North America, Inc., Erlanger, KY (US)

(72) Inventors: Tyler E. Schnug, Northville, MI (US); Gerritt B. Meyers, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 311 days.

(21) Appl. No.: 14/721,225

(22) Filed: May 26, 2015

(65) Prior Publication Data
US 2016/0347361 A1     Dec. 1, 2016

(51) Int. Cl.
*B62D 6/00* (2006.01)
*B62D 3/12* (2006.01)

(52) U.S. Cl.
CPC ....................................... *B62D 3/12* (2013.01)

(58) Field of Classification Search
None
See application file for complete search history.

(56) References Cited

U.S. PATENT DOCUMENTS

| | | | |
|---|---|---|---|
| 4,130,298 A | 12/1978 | Shaunnessey | |
| 4,907,427 A * | 3/1990 | Armstrong | B60R 25/02 70/105 |
| 5,415,019 A | 5/1995 | Perez | |
| 5,927,152 A | 7/1999 | Marzio et al. | |
| 6,419,269 B1 * | 7/2002 | Manwaring | B62D 1/184 280/775 |
| 6,952,059 B1 | 10/2005 | Louvel et al. | |
| 7,455,130 B2 | 11/2008 | Irikura | |
| 8,281,684 B2 | 10/2012 | Frasch et al. | |
| 8,511,420 B2 | 8/2013 | Kojo et al. | |
| 8,634,989 B1 | 1/2014 | Schramm | |
| 2008/0314188 A1 * | 12/2008 | Frasch | B62D 1/16 74/492 |
| 2011/0036660 A1 * | 2/2011 | Kojo | B62D 5/008 180/446 |
| 2014/0028008 A1 | 1/2014 | Stradler et al. | |

FOREIGN PATENT DOCUMENTS

JP     2006082705     3/2006

* cited by examiner

*Primary Examiner* — Ryan Rink
*Assistant Examiner* — Paul A Castro
(74) *Attorney, Agent, or Firm* — Dinsmore & Shohl LLP

(57) ABSTRACT

Vehicles and vehicle systems including locking devices are disclosed herein. In one embodiment, a vehicle includes a front wheel, a steering rack assembly that includes a rack coupled to the front wheel, where the rack extends in a vehicle lateral direction and is translatable with respect to a unibody of the vehicle in the vehicle lateral direction, and a locking device coupled to the steering rack assembly, where the locking device includes a deactivated configuration that allows translation of the rack and an activated configuration that restricts translation of the rack.

20 Claims, 20 Drawing Sheets

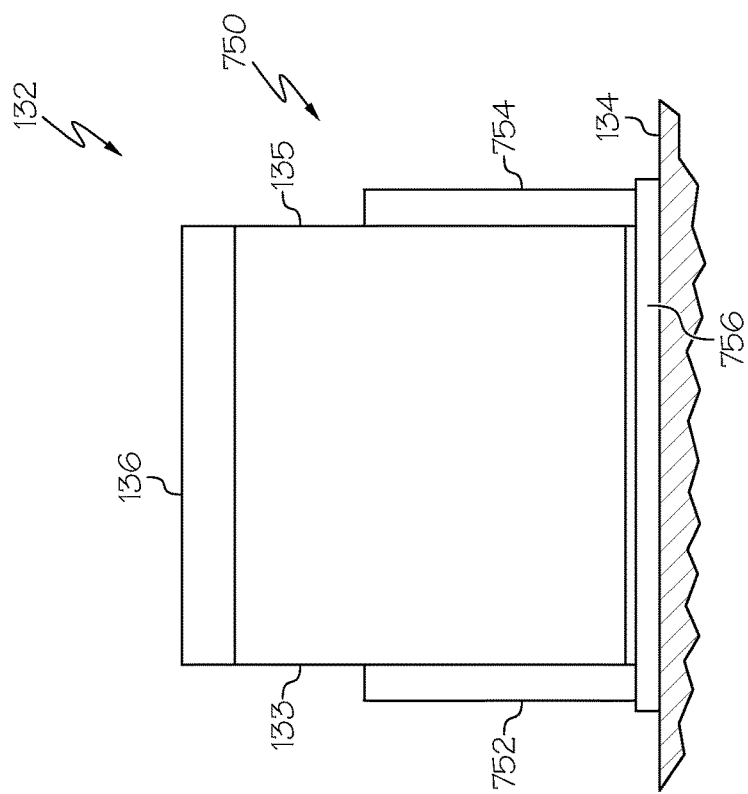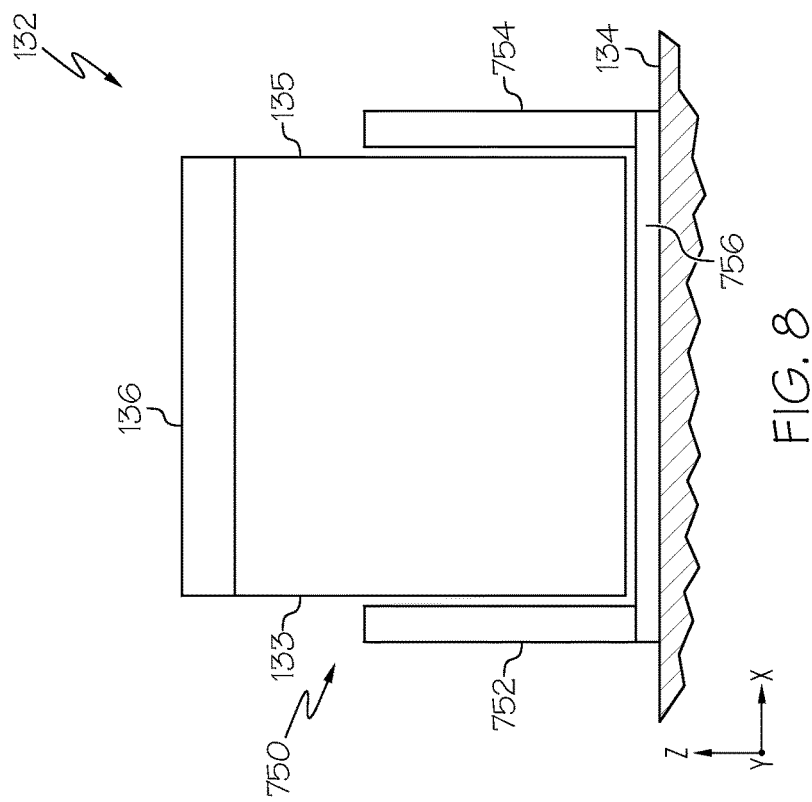

VEHICLES AND VEHICLE SYSTEMS FOR RESTRICTING ROTATION OF A VEHICLE STEERING SYSTEM

TECHNICAL FIELD

The present specification generally relates to vehicles and vehicle systems, and more specifically to vehicles and vehicle systems for restricting rotation of vehicle steering systems.

BACKGROUND

Vehicles may be equipped with steering systems that allow an occupant to steer the vehicle. Vehicles may also be equipped with bumper systems and impact protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and more particularly to a front wheel of the front suspension unit. As the unabsorbed energy is directed into the front wheel, the energy may cause the front wheel, and subsequently a steering system of the vehicle, to rotate.

Accordingly, a need exists for alternative methods and systems for restricting rotation of a steering system during a small front bumper overlap impact.

SUMMARY

In one embodiment, a vehicle includes a front wheel, a steering rack assembly that includes a rack coupled to the front wheel, where the rack extends in a vehicle lateral direction and is translatable with respect to a unibody of the vehicle in the vehicle lateral direction, and a locking device coupled to the steering rack assembly, where the locking device includes a deactivated configuration that allows translation of the rack and an activated configuration that restricts translation of the rack.

In another embodiment, a vehicle system of a vehicle includes a front wheel, a steering system including a steering rack assembly that includes a rack coupled to the front wheel, where the rack extends in a vehicle lateral direction and is translatable with respect to a unibody of the vehicle in the vehicle lateral direction, a steering column assembly coupled to the steering rack assembly, the steering column assembly including a pinion gear that is engaged with the rack of the steering rack assembly, and a steering wheel coupled to the steering column assembly, a rotational sensor coupled to at least one of the steering column assembly and the steering wheel, a locking device coupled to the steering system, where the locking device includes a deactivated configuration that allows operation of the steering system and an activated configuration that restricts operation of the steering system, and an electronic controller communicatively coupled to the rotational sensor and the locking device, the electronic controller including a processor and a memory storing a computer readable and executable instruction set, where, when the computer readable and executable instruction set is executed by the processor, the electronic controller detects a rotational speed of at least one of the of the steering column assembly and the steering wheel with the rotational sensor, and commands the locking device to change into the activated configuration based on the detected rotational speed of at least one of the steering column assembly and the steering wheel.

In yet another embodiment, a method for operating a steering system includes detecting at least one of rotational speed of a steering column assembly and a deceleration of a unibody of a vehicle, changing a locking device from a deactivated configuration to an activated configuration based on at least one of the detected rotational speed and the detected deceleration of the unibody, and engaging a rack of the steering system with the locking device in the activated configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 schematically depicts a side view of a rack and a locking device in a deactivated configuration according to one or more embodiments shown or described herein;

FIG. 9 schematically depicts a side view of the rack and the locking device of FIG. 8 in an activated configuration according to one or more embodiments shown or described herein;

DETAILED DESCRIPTION

Vehicles and vehicle systems according to the present specification include a front wheel, a steering rack assembly that includes a rack that is coupled to the front wheel, and a locking device that includes a deactivated configuration and an activated configuration. In some embodiments, the locking device is coupled to the steering rack assembly the locking device allows translation of the rack in the deactivated configuration and restricts translation of the rack in the activated configuration. In other embodiments, a rotational sensor is coupled to a steering column assembly and an inertial sensor is coupled to a unibody of the vehicle, and an electronic controller commands the locking device to change from the deactivated configuration into the activated configuration based on at least one of a detected rotational speed of the steering column and a detected deceleration of the unibody of the vehicle. In some other embodiments, the locking device is coupled to a steering column assembly of the vehicle, and at least a portion of the locking device is detached from the steering column assembly in the deactivated configuration and is engaged with the steering column assembly in the activated configuration. By moving the locking device into the activated configuration, the locking device may restrict and/or prevent rotation of the front wheel and a steering wheel that is coupled to the front wheel during an impact, such as a small front bumper overlap impact. By restricting and/or preventing rotation of the front wheel and the steering wheel, the locking device may reduce the amount of energy associated with the impact that is directed into a cabin of the vehicle and may maintain the performance of supplemental restraints that are positioned within the steering wheel. These and other embodiments will be described in more detail below in reference to the appended drawings.

Figure 1:
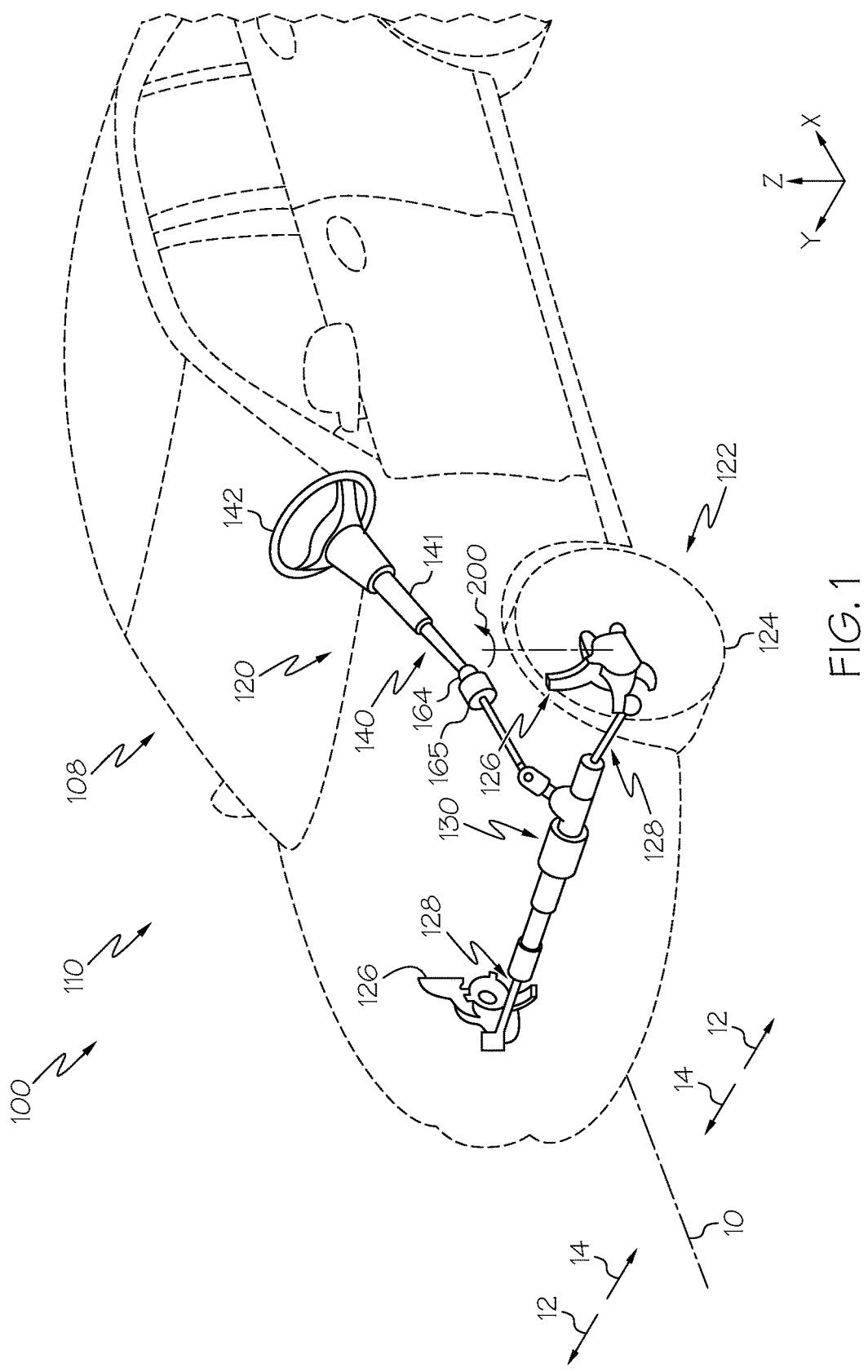
FIG. 1 schematically depicts a perspective view of a vehicle including a steering system according to one or more embodiments shown or described herein.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of the terms "inboard" and "outboard" refer may be mirrored about the vehicle centerline 10 when evaluating components positioned along opposite sides of the vehicle 100.

The phrase "communicatively coupled" is used herein to describe the interconnectivity of various components of steering system and means that the components are connected either through wires, optical fibers, or wirelessly such that electrical, optical, and/or electromagnetic signals may be exchanged between the components.

Motor vehicles that incorporate elements according to the present disclosure may include a variety of construction methodologies that are conventionally known, including the unibody construction methodology as depicted as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 100 is depicted. The vehicle 100 includes a unibody 110 onto which a vehicle drivetrain is coupled. The vehicle 100 also includes a cabin 108 that is integral with the unibody 110. The cabin 108 generally defines a passenger cabin of the vehicle 100.

The vehicle 100 includes a steering system 120. The steering system 120 generally includes a front wheel 124, a steering rack assembly 130, and a steering column assembly 140. The steering system 120 also includes a pair of front suspension units 122 that are coupled to the unibody 110. The front suspension units 122 generally include vehicle components that connect the unibody 110 of the vehicle 100 to the front wheel 124. These components may include a front chassis member that includes a spring and a strut. The spring and the strut may be coupled to a steering knuckle assembly 126 that includes a hub. The front wheel 124 may be coupled to the hub of the steering knuckle assembly 126, thereby coupling the front wheel 124 to the steering knuckle assembly 126.

The steering knuckle assembly 126 is coupled to a tie rod 128 that is positioned inboard of the front wheel 124. The tie rod 128 is also coupled to the steering rack assembly 130. Accordingly, the front wheel 124 is coupled to the steering rack assembly 130 through the steering knuckle assembly 126 and the tie rod 128. The steering rack assembly 130 extends in the vehicle lateral direction and manipulates an orientation of the front wheel 124 with respect to the unibody 110, as will be described in greater detail herein.

The steering column assembly 140 is coupled to the steering rack assembly 130. The steering column assembly 140 extends rearward of the steering rack assembly 130 in the vehicle longitudinal direction. The steering column assembly 140 may also be coupled to a steering wheel 142 that is positioned within the cabin 108 of the vehicle 100. Accordingly, the steering wheel 142 is coupled to the front wheel 124 through the steering column assembly 140, the steering rack assembly 130, the tie rod 128, and the steering knuckle assembly 126. By rotating the steering wheel 142, an occupant of the vehicle 100 may manipulate the orientation of the front wheel 124 with respect to the unibody 110 of the vehicle 100. Specifically, when the steering wheel 142 is rotated, the front wheel 124 rotates about an axis 200 with respect to the unibody 110 of the vehicle 100. By rotating the front wheel 124 about the axis 200 with respect to the unibody 110 of the vehicle 100, an occupant may steer the vehicle 100 during normal vehicle operation.

Similarly, when the front wheel 124 is rotated about the axis 200 with respect to the unibody 110, for example when an external force is applied to the front wheel 124, the steering wheel 142 is rotated. An external force may be applied to the front wheel 124 during a variety of driving conditions, including driving the vehicle 100 over an uneven driving surface, or an impact to the vehicle 100, as will be described in greater detail herein.

Figure 2:
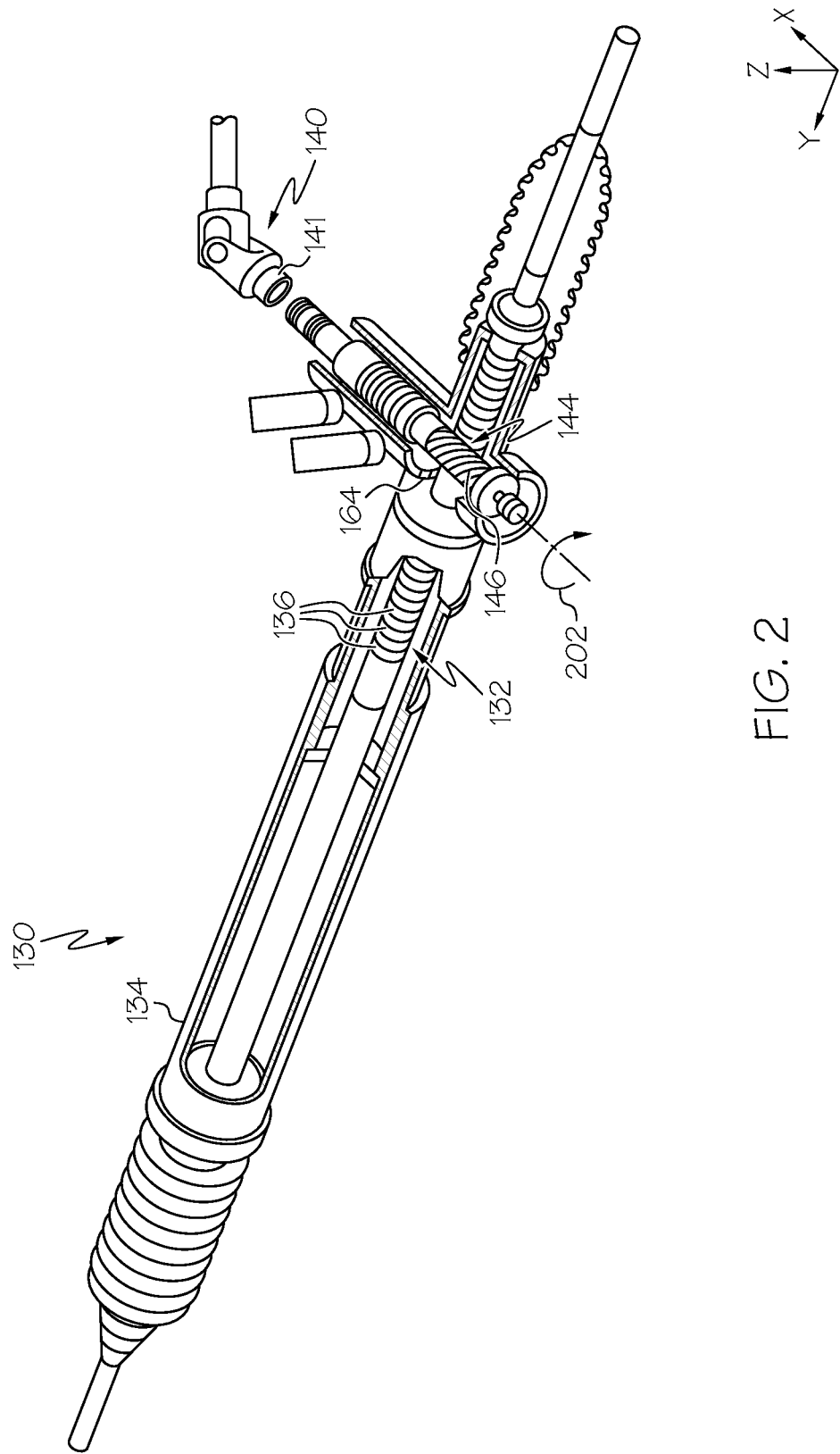
FIG. 2 schematically depicts an enlarged perspective view of a steering rack assembly and a steering column assembly of a steering system according to one or more embodiments shown or described herein.

In vehicles that include an electronically assisted power steering system, a motor 165 is coupled to the steering column assembly 140. The motor 165 may provide increased torque to the steering rack assembly 130 as compared to a torque applied to the steering wheel 142 by an occupant, thus reducing the amount of torque required for the occupant to steer the vehicle. A rotational sensor 164 is also coupled to the steering column assembly 140. In some embodiments, the rotational sensor 164 may also or may alternatively be coupled to the steering wheel 142. The rotational sensor 164 detects a rotational speed of the steering column assembly 140 and/or the steering wheel 142. The rotational sensor 164 may include various rotational detection devices coupled to the steering column assembly 140, including, but not limited to, an encoder wheel, a magnetic wheel, or the like. In some embodiments, such as in vehicles including electrically assisted power steering, the rotational sensor 164 is integral with the motor 165. In other embodiments, the rotational sensor 164 includes a separate sensor coupled to a steering column 141 of the steering column assembly 140. Referring to FIG. 2, in some other embodiments, the rotational sensor 164 includes sensors that detect a rotation speed of a pinion gear 144 of the steering column assembly 140. In such embodiments, the rotational sensor 164 may include a various sensors configured to detect rotation of the pinion gear 144 through detection of a plurality of teeth 146 of the pinion gear 144, including, but not limited to proximity sensors and the like.

Still referring to FIG. 2, the steering rack assembly 130 is depicted with certain portions removed for clarity. The steering rack assembly 130 includes a rack 132 that is positioned within a housing 134. The housing 134 is coupled to the unibody 110 of the vehicle 100 such that the position of the housing 134 of the steering rack assembly 130 is generally fixed with respect to the unibody 110 during normal vehicle operation. The rack 132 is positioned at least partially within the housing 134. The rack 132 is translatable in the vehicle lateral direction with respect to the housing 134. Because the housing 134 is coupled to the unibody 110, the rack 132 is translates in the vehicle lateral direction with respect to the unibody 110.

The steering column assembly 140 includes the pinion gear 144 that is coupled to the steering column 141, such that when the steering column 141 is rotated, the pinion gear 144 rotates about axis 202. The pinion gear 144 includes the plurality of teeth 146 that may engage a plurality of teeth 136 on the rack 132. As the pinion gear 144 rotates about axis 202, the engagement between the plurality of teeth 146 of the pinion gear 144 and the plurality of teeth 136 of the rack 132 causes the rack 132 to translate in the vehicle lateral direction. Similarly, when the rack 132 is translated, such as when an external force is applied to the rack 132, the engagement between the plurality of teeth 146 of the pinion gear 144 and the plurality of teeth 136 of the rack 132 causes the pinion gear 144 to rotate.

Figure 3:
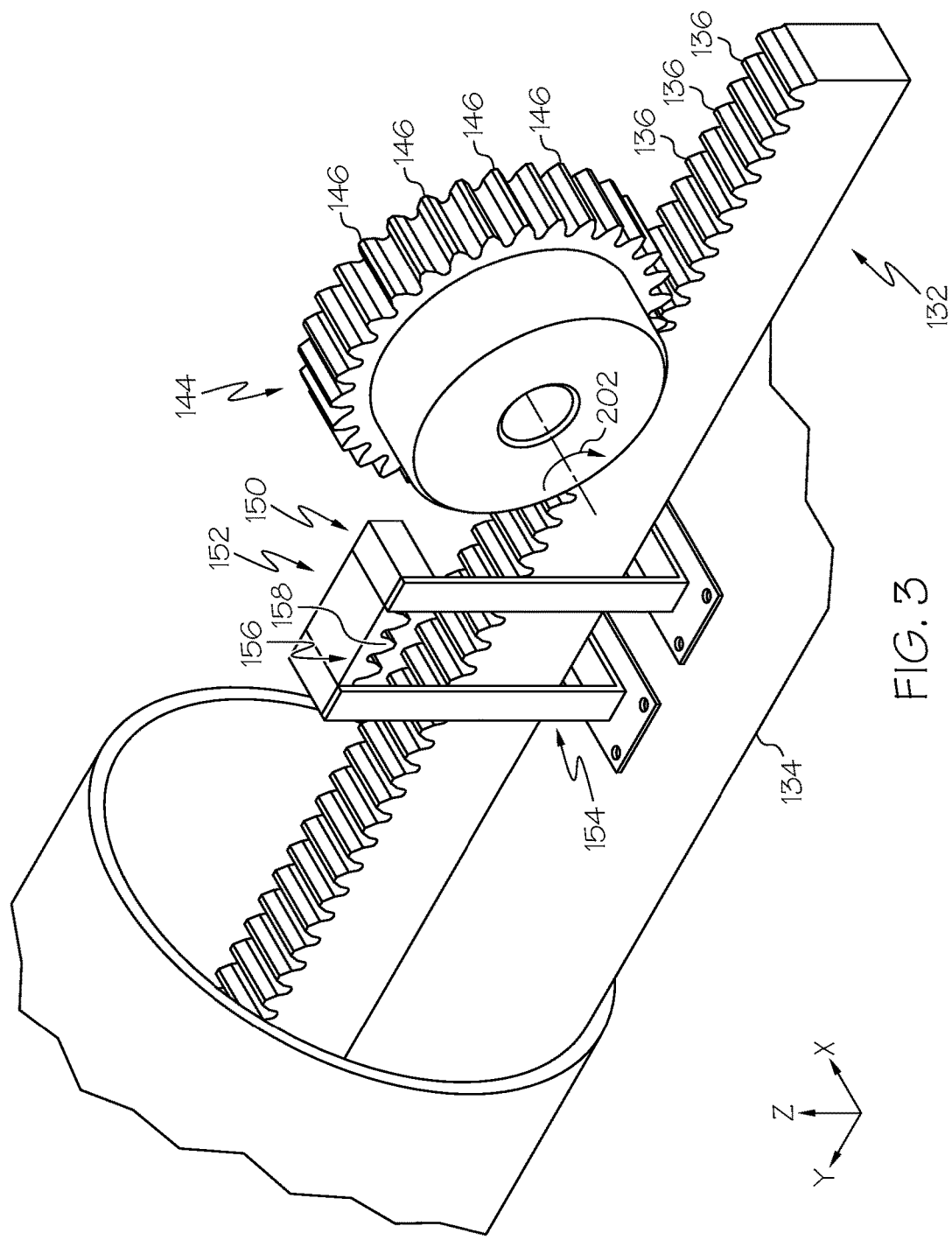
FIG. 3 schematically depicts an enlarged perspective view of a rack and a locking device in a deactivated configuration according to one or more embodiments shown or described herein.

Referring to FIG. 3, the rack 132 and the pinion gear 144 are shown in isolation with a locking device 150. As described hereinabove, the plurality of teeth 146 of the pinion gear 144 are engaged with the plurality of teeth 136 of the rack 132. In some embodiments, such as the embodiment depicted in FIG. 3, the plurality of teeth 146 of the pinion gear 144 may be straight-cut gear teeth (i.e., are aligned in an axial direction of the pinion gear 144). In other embodiments, such as the embodiment depicted in FIG. 2, the plurality of teeth 146 of the pinion gear 144 may be helically cut gear teeth. It should be understood that the plurality of teeth 146 may include any suitable shape that is engagable with the plurality of teeth 136 of the rack 132.

The locking device 150 of the steering system 120 is coupled to the unibody 110. In some embodiments, such as the embodiment depicted in FIG. 3, the locking device 150 may be coupled to the housing 134 which is coupled to the unibody 110, thereby coupling the locking device 150 to the unibody 110. The locking device 150 is coupled to the unibody 110 such that the position of the locking device 150 is generally fixed with respect to the unibody 110.

During ordinary vehicle operation, the locking device 150 is in a deactivated configuration, as shown in FIG. 3. In some embodiments, at least a portion of the locking device 150 is spaced apart and detached from the rack 132 while the locking device 150 is in the deactivated configuration. The locking device 150 includes a locking portion 152 and a stationary portion 154. The stationary portion 154 is coupled to the housing 134 of the steering rack assembly 130. Accordingly, the stationary portion 154 of the locking device 150 is coupled to the unibody 110 of the vehicle 100 through the housing 134. The stationary portion 154 of the locking device 150 is spaced apart from the rack 132 such that the stationary portion 154 does not interfere with translation of the rack 132 in the vehicle lateral direction during ordinary vehicle operation.

The locking portion 152 of the locking device 150 is coupled to the stationary portion 154 and is spaced apart from the rack 132 in the deactivated configuration. The locking portion 152 includes at least one blocking element 156 that engages ones of the plurality of teeth 136 of the rack 132. The at least one blocking element 156 may include at least one tooth 158 that engages ones of the plurality of teeth 136 of the rack 132. The at least one blocking element 156 of the locking device 150 is spaced apart and detached from the rack 132 when the locking device 150 in the deactivated configuration. In some embodiments, such as the embodiment shown in FIG. 3, the at least one blocking element 156 of the locking device 150 is spaced apart and detached from the rack 132 and the at least one blocking element 156 is oriented to face in a direction that opposes the plurality of teeth 136 of the rack 132. When the plurality of teeth 136 of the rack 132 are oriented to face upward in the vehicle vertical direction, such as in the embodiment depicted in FIG. 3, the at least one blocking element 156 is oriented to face downward in the vehicle vertical direction. Because the at least one blocking element 156 of the locking device is spaced apart and detached from the plurality of teeth 136 of the rack 132, when the locking device 150 is in the deactivated configuration, the rack 132 may translate freely in the vehicle lateral direction. As the rack 132 may translate freely in the vehicle lateral direction, the steering wheel 142 (FIG. 1) that is coupled to the rack 132 through the steering column assembly 140 may freely rotate. Likewise, the front wheel 124 (FIG. 1) that is coupled to the rack 132 through the tie rod 128 may freely rotate with respect to the unibody 110.

Figure 4:
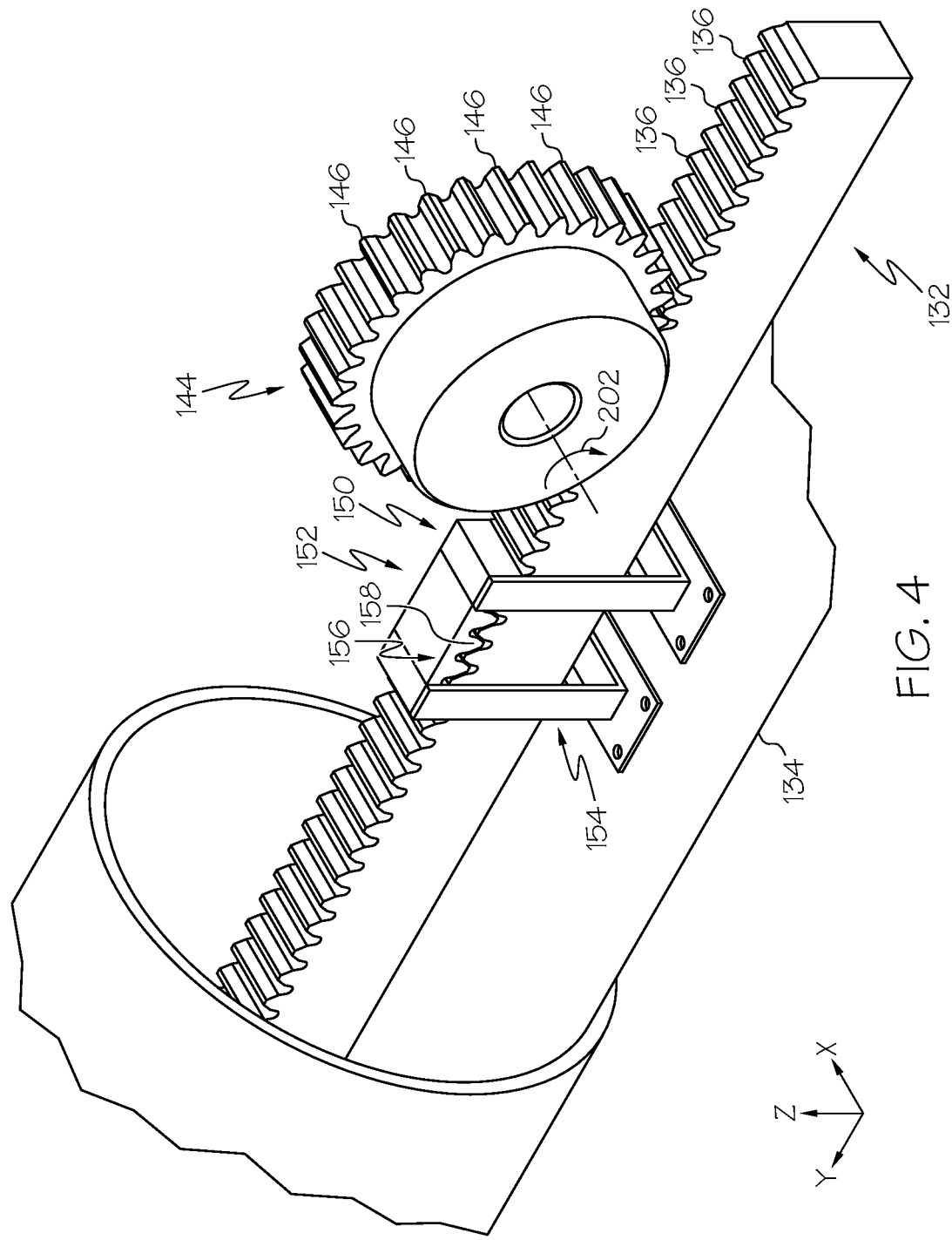
FIG. 4 schematically depicts an enlarged perspective view of the rack and the locking device of FIG. 3 in an activated configuration according to one or more embodiments shown or described herein.

The locking device 150 may be changed between the deactivated configuration shown in FIG. 3 and an activated configuration, as shown in FIG. 4. As described hereinabove, in the deactivated configuration, at least a portion of the locking device 150 is detached and spaced apart from the rack 132. In the activated configuration, at least a portion of the locking device 150 is engaged with the rack 132. In some embodiments, the at least one blocking element 156 of the locking device 150 engages and contacts the plurality of teeth 136 of the rack 132. In embodiments where the at least one blocking element 156 includes at least one tooth 158, the at least one tooth 158 of the locking device 150 engages and contacts ones of the plurality of teeth 136 of the rack 132.

As described hereinabove, the stationary portion 154 of the locking device 150 is coupled to the unibody 110 through the housing 134. Because the stationary portion 154 of the locking device 150 is coupled to the unibody 110, when the at least one blocking element 156 of the locking device 150 engages and contacts the plurality of teeth 136 of the rack 132, the locking device 150 forms a generally rigid connection between the rack 132 and the unibody 110 of the vehicle 100. Accordingly, when the locking device 150 is in the activated configuration, the locking device 150 prevents translation of the rack 132 of the steering rack assembly 130 with respect to the unibody 110. The locking device 150 may be changed from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the rack 132 through the tie rod 128. Accordingly, by preventing translation of the rack 132 in the vehicle lateral direction when the locking device 150 is in the activated configuration, the locking device 150 maintains the orientation of the front wheel 124 with respect to the unibody 110 of the vehicle 100 and prevents rotation of the front wheel 124 about the axis 200. Likewise, the steering column assembly 140 and the steering wheel 142 are coupled to the rack 132 through the pinion gear 144. Accordingly, when the locking device 150 is in the activated configuration, the locking device 150 prevents rotation of the steering wheel 142.

Figure 5:
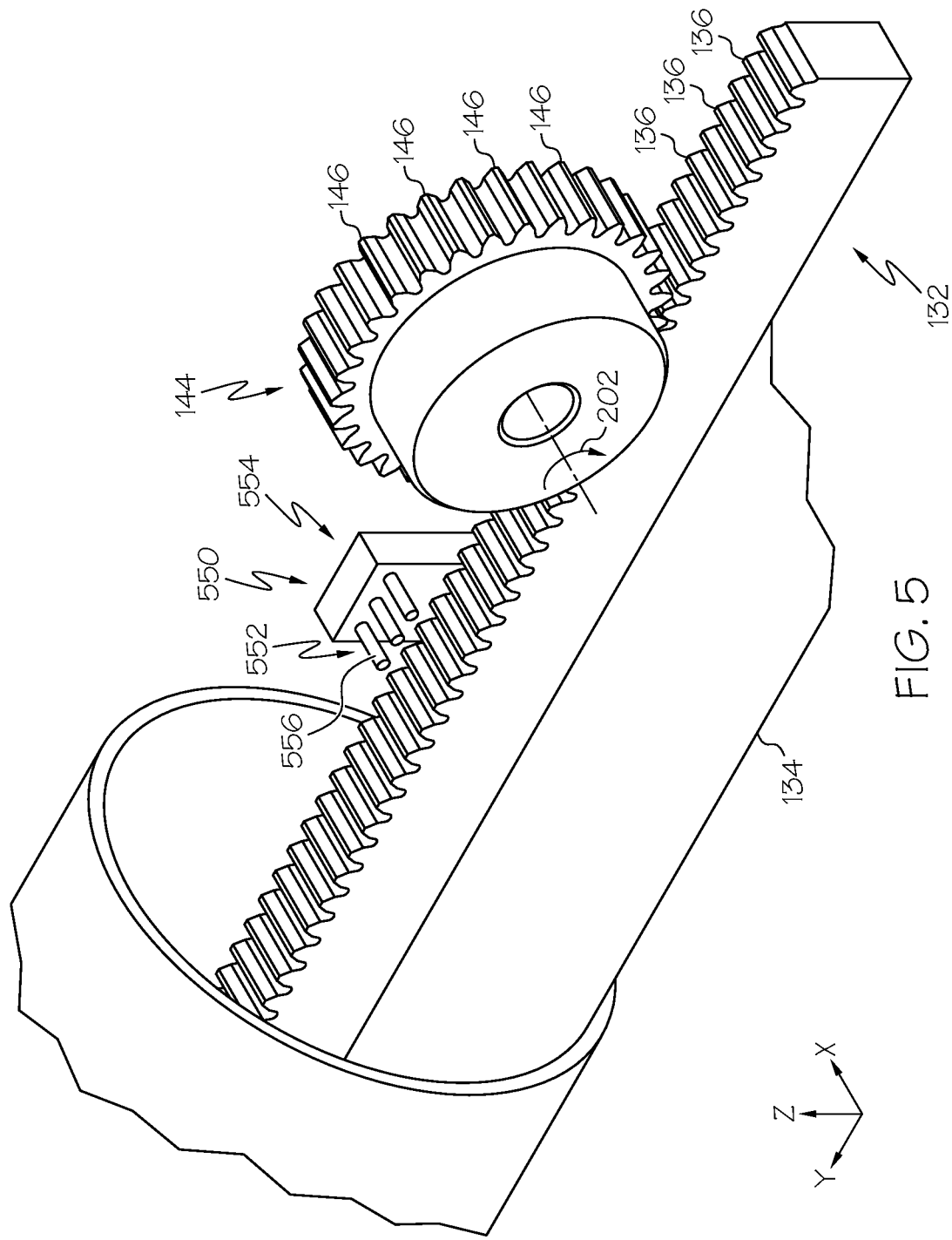
FIG. 5 schematically depicts an enlarged perspective view of a rack and a locking device in a deactivated configuration according to one or more embodiments shown or described herein.

Referring to FIG. 5, another embodiment of a locking device 550 and the rack 132 is depicted. In some embodiments, such as the embodiment depicted in FIG. 5, the locking device 550 is coupled to the housing 134 which is coupled to the unibody 110, thereby coupling the locking device 550 to the unibody 110. The locking device 550 is coupled to the unibody 110 such that the locking device 550 is generally fixed with respect to the unibody 110.

During ordinary vehicle operation, the locking device 550 is in a deactivated configuration, as shown in FIG. 5, and at least a portion of the locking device 550 is spaced apart and detached from the rack 132. The locking device 550 includes a locking portion 552 and a stationary portion 554. The stationary portion 554 is coupled to the housing 134 of the steering rack assembly 130, thereby coupling the stationary portion 554 to the unibody 110 of the vehicle 100. The stationary portion 554 of the locking device 550 is spaced apart from the rack 132 such that the stationary portion 554 does not interfere with translation of the rack 132 in the vehicle lateral direction during ordinary vehicle operation.

The locking portion 552 of the locking device 550 is coupled to the stationary portion 554 and is spaced apart from the rack 132 in the deactivated configuration. The locking portion 552 includes at least one blocking element 556 that may engage ones of the plurality of teeth 136 of the rack 132. In embodiments, the at least one blocking element 556 includes generally cylindrically shaped elements. Alternatively, the at least one blocking element 556 may include at least one tooth configured to engage the plurality of teeth 136 of the rack 132. The at least one blocking element 556 of the locking device 550 is spaced apart and detached from the rack 132 when the locking device 550 in the deactivated configuration. In some embodiments, such as the embodiment shown in FIG. 5, the at least one blocking element 556 of the locking device 550 is spaced apart and detached from the rack 132 and the at least one blocking element 556 is oriented to face in a direction that is orthogonal to the plurality of teeth 136 of the rack 132. When the plurality of teeth 136 of the rack 132 are oriented to face upward in the vehicle vertical direction, such as in the embodiment depicted in FIG. 5, the at least one blocking element 556 is oriented to face in a vehicle longitudinal direction. Because the at least one blocking element 556 of the locking device 550 is spaced apart and detached from the plurality of teeth 136 of the rack 132 when the locking device 550 is in the deactivated configuration, the rack 132 may translate freely in the vehicle lateral direction. As the rack 132 may translate freely in the vehicle lateral direction, the steering wheel 142 (FIG. 1) that is coupled to the rack 132 through the steering column assembly 140 may freely rotate. Likewise, the front wheel 124 (FIG. 1) that is coupled to the rack 132 through the tie rod 128 may freely rotate with respect to the unibody 110.

Figure 6:
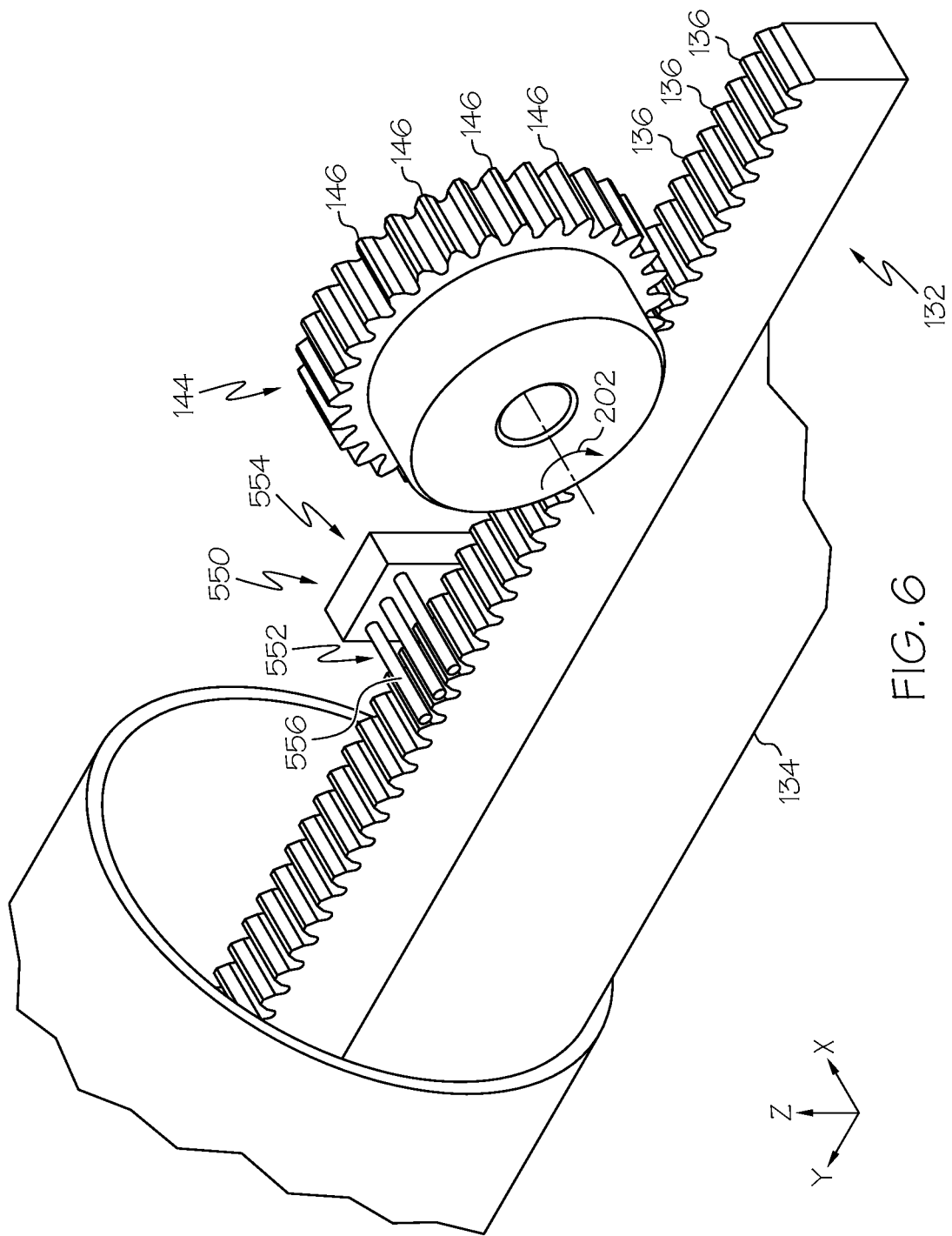
FIG. 6 schematically depicts an enlarged perspective view of the rack and the locking device of FIG. 5 in an activated configuration according to one or more embodiments shown or described herein.

The locking device 550 may be changed between the deactivated configuration shown in FIG. 5 and an activated configuration, as shown in FIG. 6. As described hereinabove, in the deactivated configuration, at least a portion of the locking device 550 is detached and spaced apart from the rack 132. In the activated configuration, at least a portion of the locking device 550 is engaged with the rack 132. In some embodiments, the at least one blocking element 556 of the locking device 550 engages and contacts the plurality of teeth 136 of the rack 132 in the activated configuration. As noted hereinabove, the stationary portion 554 of the locking device 750 is coupled to the unibody 110 through the housing 134. Because the locking device 550 is coupled to the unibody 110, when the at least one blocking element 556 of the locking device 550 engages and contacts the plurality of teeth 136 of the rack 132, the locking device 550 forms a generally rigid connection between the rack 132 and the unibody 110 of the vehicle 100. Accordingly, when the locking device 550 is in the activated configuration, the locking device 550 prevents translation of the rack 132 of the steering rack assembly 130 with respect to the unibody 110. The locking device 550 may be changed from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the rack 132 through the tie rod 128. Accordingly, when the locking device 550 is in the activated configuration, the locking device 550 maintains the orientation of the front wheel 124 with respect to the unibody 110 of the vehicle 100 and prevents rotation of the front wheel 124 about the axis 200. Likewise, as noted hereinabove, the steering column assembly 140 and the steering wheel 142 are coupled to the rack 132 through the pinion gear 144. Accordingly, when the locking device 550 is in the activated configuration, the locking device 550 prevents rotation of the steering wheel 142.

Figure 7:
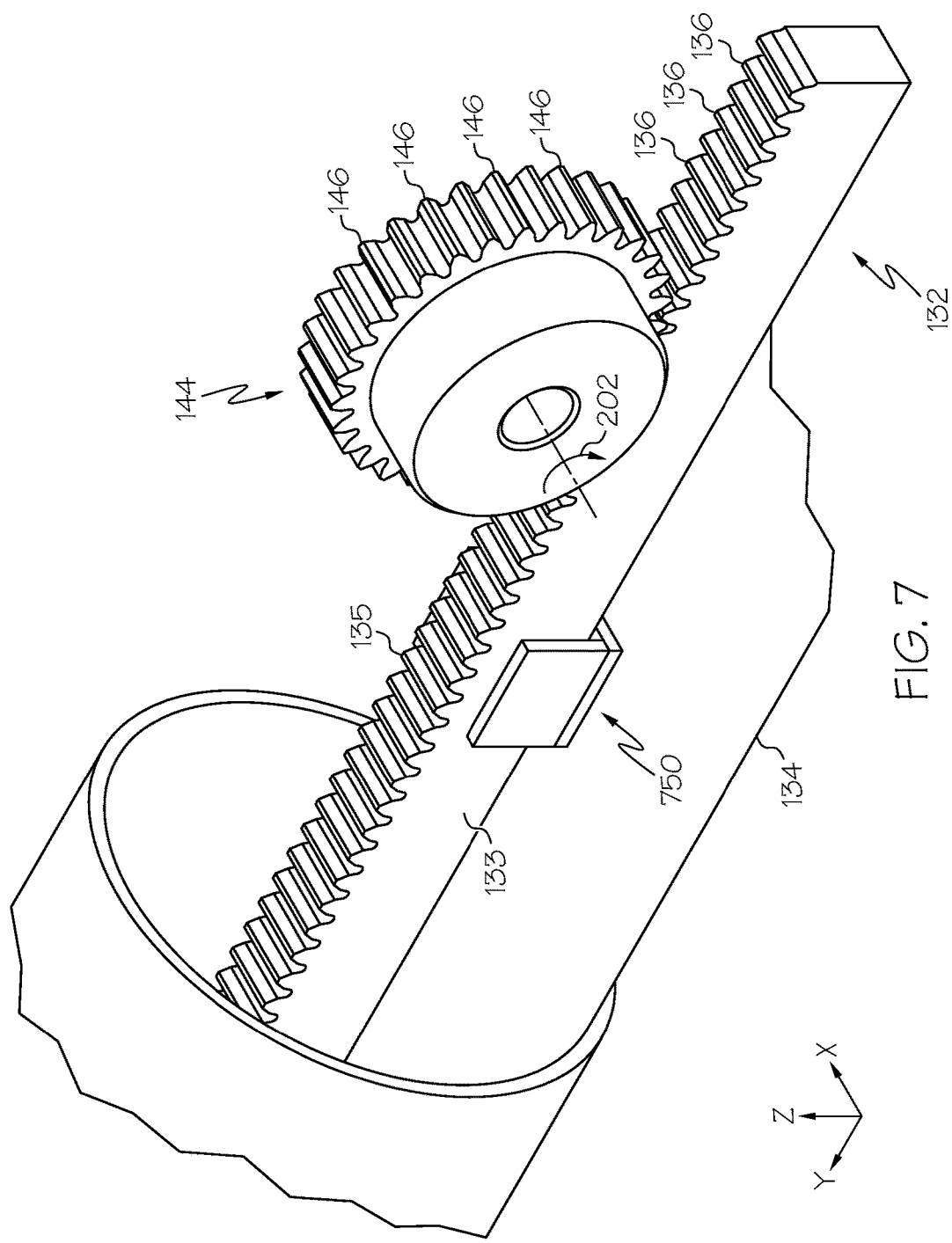
FIG. 7 schematically depicts a perspective view of a rack and a locking device in a deactivated configuration according to one or more embodiments shown or described herein.

Referring to FIG. 7, another embodiment of a locking device 750 and the rack 132 is depicted. In some embodiments, such as the embodiment depicted in FIG. 7, the locking device 750 is coupled to the housing 134, which is coupled to the unibody 110, thereby coupling the locking device 750 to the unibody 110. The locking device 750 is coupled to the unibody 110 such that the locking device 750 is generally fixed with respect to the unibody 110. In the embodiment of the locking device 750 depicted in FIG. 7, the locking device 750 is positioned along a first lateral face 133 and a second lateral face 135 of the rack 132.

Referring to FIG. 8, a side view of the locking device 750 and the rack 132 is depicted. During ordinary vehicle operation, the locking device 750 is in a deactivated configuration, as shown in FIG. 8, and at least a portion of the locking device 750 is spaced apart and detached from the rack 132. The locking device 750 includes a first pad 752 and/or a second pad 754, and a stationary portion 756. The stationary portion 756 is coupled to the housing 134 of the steering rack assembly 130, thereby coupling the stationary portion 756 to the unibody 110 of the vehicle 100. The stationary portion 756 of the locking device 750 is positioned beneath and spaced apart from the rack 132 such that the stationary portion 756 does not interfere with translation of the rack 132 in the vehicle lateral direction during ordinary vehicle operation. Alternatively, the stationary portion 756 of the locking device 750 may be positioned above and spaced apart from the rack 132 in the vehicle vertical direction.

The first pad 752 and/or the second pad 754 of the locking device 750 are coupled to the stationary portion 756 and are spaced apart from the rack 132 in the deactivated configuration. The first pad 752 and/or the second pad 754 of the locking device 750 are moveably coupled to the stationary portion 756 such that the first pad 752 and/or the second pad 754 move in the vehicle longitudinal direction with respect to the stationary portion 756. While the first pad 752 and/or the second pad 754 are moveable with respect to the stationary portion 756 in the vehicle longitudinal direction, the first pad 752 and/or the second pad 754 are coupled to the stationary portion 756 such that the position of the first pad 752 and/or the second pad 754 is generally fixed in the vehicle lateral direction. In some embodiments, the first pad 752 is spaced apart from the first lateral face 133 of the rack 132 and the second pad 754 is spaced apart from the second lateral face 135 of the rack 132 while the locking device 750 is in the deactivated configuration. Because the first pad 752 and/or the second pad 754 are spaced apart from the first lateral face 133 and the second lateral face 135 of the rack 132, the rack 132 may translate freely in the vehicle lateral direction during ordinary vehicle operation. As the rack 132 may translate freely in the vehicle lateral direction, the steering wheel 142 (FIG. 1) that is coupled to the rack 132 through the steering column assembly 140 may freely rotate. Likewise, the front wheel 124 (FIG. 1) that is coupled to the rack 132 through the tie rod 128 may freely rotate with respect to the unibody 110.

The locking device 750 may be changed between the deactivated configuration shown in FIG. 8 and an activated configuration, as shown in FIG. 9. As described hereinabove, in the deactivated configuration, at least a portion of the locking device 750 is detached and spaced apart from the rack 132. To change between the deactivated configuration and the activated configuration, the first pad 752 and/or second pad 754 move in the vehicle longitudinal direction toward the rack 132. In the activated configuration, at least a portion of the locking device 750 is engaged with the rack 132. In some embodiments, the first pad 752 engages and contacts the first lateral face 133 of the rack 132 and/or the second pad 754 engages and contacts the second lateral face 135 of the rack 132 in the activated configuration.

As described hereinabove, the stationary portion 756 of the locking device 750 is coupled to the unibody 110 through the housing 134. Because the locking device 750 is coupled to the unibody 110, when first pad 752 and/or the second pad 754 of the locking device 750 engages and contacts the first lateral face 133 and/or the second lateral face 135 of the rack 132, the locking device 750 forms a generally rigid connection between the rack 132 and the unibody 110 of the vehicle 100. In particular, frictional forces associated with contact between the first pad 752 and/or the second pad 754 and the first lateral face 133 and/or the second lateral face 135 of the rack 132, respectively, may form a generally rigid connection between the rack 132 and the unibody 110 of the vehicle. Accordingly, when the locking device 750 is in the activated configuration, the locking device 750 prevents translation of the rack 132 of the steering rack assembly 130 with respect to the unibody 110 in the vehicle lateral direction. Further, by engaging the first lateral face 133 and/or the second lateral face 135 of the rack 132, the locking device 750 prevents translation of the rack 132 without engaging the teeth 136 of the rack 132, such that the locking device 750 may prevent translation in steering systems that include racks or track rods that do not include teeth. It should be understood that the first pad 752 and/or the second pad 754 may be formed from materials suitable for applying frictional force to the rack 132 including, but not limited to, metals, composites, glass composites, rubber, high-heat resins, kevlar, or the like. The locking device 750 may be changed from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the rack 132 through the tie rod 128. Accordingly, when the locking device 750 is in the activated configuration, the locking device 750 maintains the orientation of the front wheel 124 with respect to the unibody 110 of the vehicle 100 prevents rotation of the front wheel 124 about the axis 200. Likewise, as noted hereinabove, the steering column assembly 140 and the steering wheel 142 are coupled to the rack 132 through the pinion gear 144. Accordingly, when the locking device 750 is in the activated configuration, the locking device 750 prevents rotation of the steering wheel 142.

Figures 10, 11:
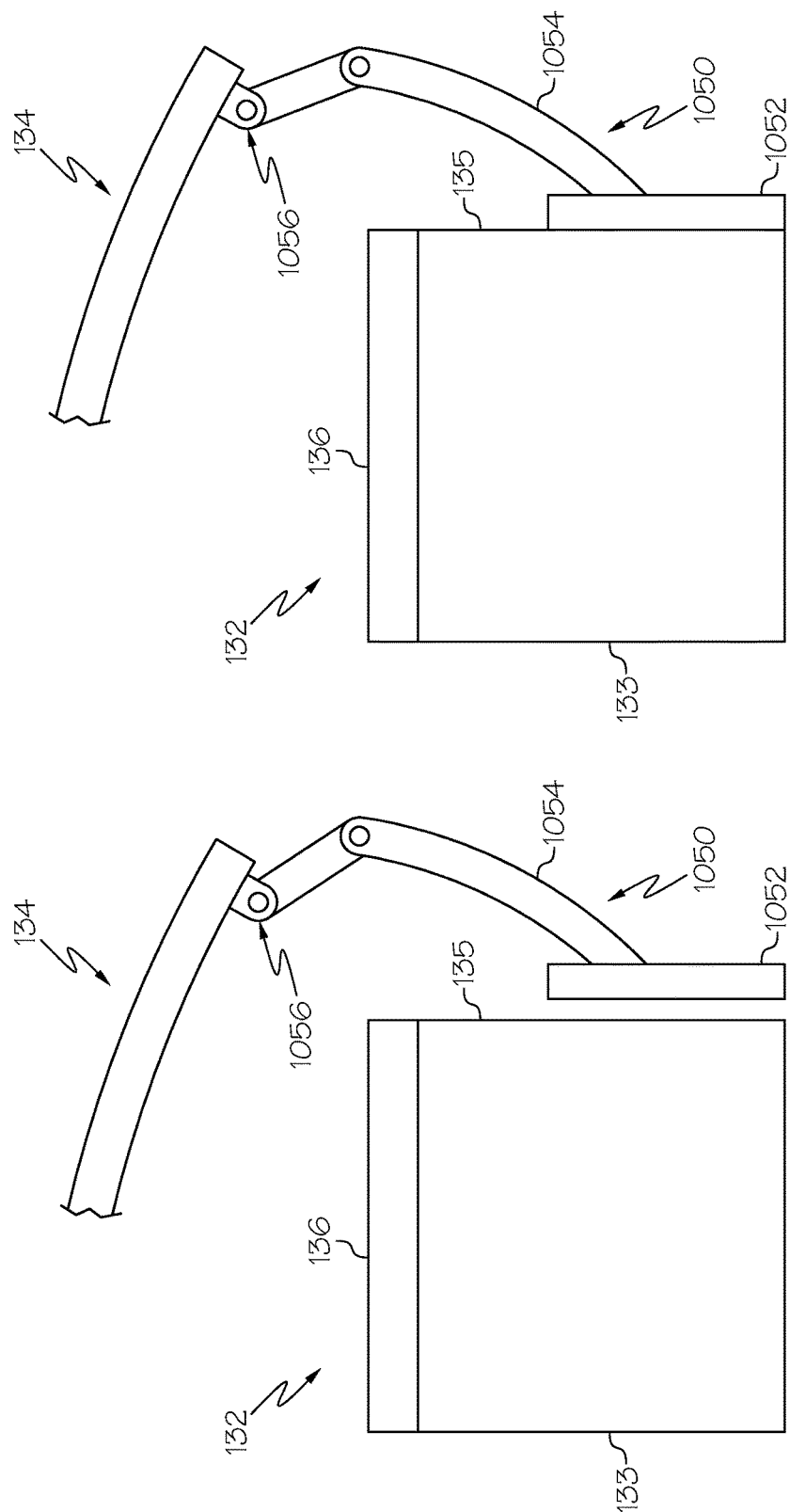
FIG. 10 schematically depicts a side view of a rack and a locking device in a deactivated configuration according to one or more embodiments shown or described herein.
FIG. 11 schematically depicts a side view of the rack and the locking device of FIG. 10 in an activated configuration according to one or more embodiments shown or described herein.

Referring to FIG. 10, a side view of another embodiment of a locking device 1050 and the rack 132 is depicted. During ordinary vehicle operation, the locking device 1050 is in a deactivated configuration, as shown in FIG. 10, and at least a portion of the locking device 1050 is spaced apart and detached from the rack 132. The locking device 1050 includes a pad 1052 and a stationary portion 1056. The stationary portion 1056 is coupled to the housing 134 of the steering rack assembly 130, thereby coupling the stationary portion 1056 of the locking device 1050 to the unibody 110 of the vehicle 100. The stationary portion 1056 of the locking device 1050 is spaced apart from the rack 132 such that the stationary portion 1056 does not interfere with translation of the rack 132 in the vehicle lateral direction during ordinary vehicle operation. In embodiments, such as the embodiment depicted in FIG. 10, the stationary portion 154 may be positioned above the rack 132 in the vehicle vertical direction. The stationary portion 1056 may be alternatively or additionally be positioned forward or rearward of the rack 132 in the vehicle longitudinal direction. In some embodiments, the stationary portion 1056 may be positioned beneath the rack 132 in the vehicle vertical direction.

The pad 1052 is coupled to the stationary portion 1056 and is detached and spaced apart from the rack 132 in the deactivated configuration. The pad 1052 is pivotally coupled to the stationary portion 1056 through at least one arm 1054 such that the pad 1052 is moveable with respect to the rack 132 in the vehicle longitudinal direction. In particular, the pad 1052 is coupled to the at least one arm 1054, which is pivotally coupled to the stationary portion 1056. While the pad 1052 is moveable with respect to the rack 132 in the vehicle longitudinal direction, the pad 1052 and the at least one arm 1054 are coupled to the stationary portion 1056 such that the position of the pad 1052 is generally fixed in the vehicle lateral direction. In some embodiments, the pad 1052 is spaced apart from the second lateral face 135 of the rack 132 in the deactivated configuration. The pad 1052 may alternatively be detached and spaced apart from the first lateral face 133 of the rack 132 in the deactivated configuration.

Because the pad 1052 is spaced apart from the second lateral face 135 of the rack 132, the rack 132 may translate freely in the vehicle lateral direction during ordinary vehicle operation. As the rack 132 may translate freely in the vehicle lateral direction, the steering wheel 142 (FIG. 1) that is coupled to the rack 132 through the steering column assembly 140 may freely rotate. Likewise, the front wheel 124 (FIG. 1) that is coupled to the rack 132 through the tie rod 128 may freely rotate with respect to the unibody 110.

The locking device 1050 may be changed between the deactivated configuration shown in FIG. 10 and an activated configuration, as shown in FIG. 11. As described hereinabove, in the deactivated configuration, at least a portion of the locking device 1050 is detached and spaced apart from the rack 132. To change between the deactivated configuration and the activated configuration, the at least one arm 1054 pivots about the stationary portion 1056, which causes the pad 1052 move in the vehicle longitudinal direction toward the rack 132. In the activated configuration, at least a portion of the locking device 1050 is engaged with the rack 132. In some embodiments, the pad 1052 engages and contacts the second lateral face 135 of the rack 132 in the activated configuration. The pad 1052 may alternatively contact and engage the first lateral face 133 of the rack 132 in the activated configuration.

As described hereinabove, the stationary portion 1056 of the locking device 1050 is coupled to the unibody 110 through the housing 134. Because the locking device 1050 is coupled to the unibody 110, when the pad 1052 of the locking device 550 engages and contacts the second lateral face 135 of the rack 132, the locking device 1050 forms a generally rigid connection between the rack 132 and the unibody 110 of the vehicle 100. In particular, frictional forces associated with contact between the pad 1052 and the second lateral face 135 of the rack 132 may form a generally rigid connection between the rack 132 and the unibody 110 of the vehicle. Accordingly, when the locking device 1050 is in the activated configuration, the locking device 1050 prevents translation of the rack 132 of the steering rack assembly 130 with respect to the unibody 110 in the vehicle lateral direction. Further, by engaging the second lateral face 135 of the rack 132, the locking device 1050 may prevent translation of the rack 132 without engaging the teeth 136 of the rack 132, such that the locking device 1050 may prevent translation in steering systems that include racks or track rods that do not include teeth. It should be understood that the pad 1052 may be formed from materials suitable for applying frictional force to the rack 132 including, but not limited to, metals, composites, glass composites, rubber, high-heat resins, kevlar, or the like. The locking device 1050 may be changed from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the rack 132 through the tie rod 128. Accordingly, when the locking device 1050 is in the activated configuration, the locking device 1050 maintains the orientation of the front wheel 124 with respect to the unibody 110 of the vehicle 100 prevents rotation of the front wheel 124 about the axis 200. Likewise, as noted hereinabove, the steering column assembly 140 and the steering wheel 142 are coupled to the rack 132 through the pinion gear 144. Accordingly, when the locking device 1050 is in the activated configuration, the locking device 1050 prevents rotation of the steering wheel 142.

Figure 12:
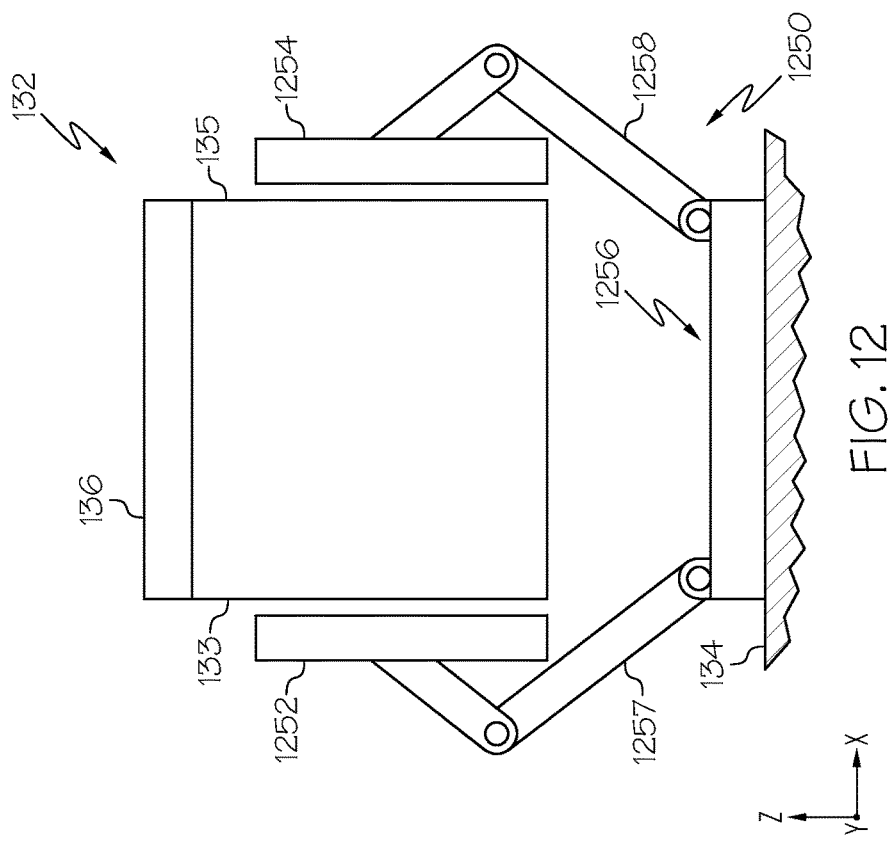
FIG. 12 schematically depicts a side view of a rack and a locking device in a deactivated configuration according to one or more embodiments shown or described herein.

Referring to FIG. 12, a side view of another embodiment of a locking device 1250 and the rack 132 is depicted.

During ordinary vehicle operation, the locking device 1250 is in a deactivated configuration, as shown in FIG. 12, and at least a portion of the locking device 1250 is spaced apart and detached from the rack 132. The locking device 1250 includes a first pad 1252 and/or a second pad 1254, and a stationary portion 1256. The stationary portion 1256 is coupled to the housing 134 of the steering rack assembly 130, thereby coupling the stationary portion 1256 of the locking device 1250 to the unibody 110 of the vehicle 100. The stationary portion 1256 of the locking device 1250 is positioned beneath and spaced apart from the rack 132 such that the stationary portion 1256 does not interfere with translation of the rack 132 in the vehicle lateral direction during ordinary vehicle operation. Alternatively, the stationary portion 1256 of the locking device 1250 may be positioned above and spaced apart from the rack 132 in the vehicle vertical direction.

The first pad 1252 and/or the second pad 1254 of the locking device 1250 are coupled to the stationary portion 1256 and are spaced apart from the rack 132 in the deactivated configuration. The first pad 1252 and/or the second pad 1254 of the locking device 1250 are pivotally coupled to the stationary portion 1256 through a first arm 1257 and/or a second arm 1258, respectively. The first arm 1257 and/or the second arm 1258 pivot with respect to the stationary portion 1256 such that the first pad 1252 and/or the second pad 1254 are movable in the vehicle longitudinal direction with respect to the stationary portion 1256. In some embodiments, the first pad 1252 is spaced apart from the first lateral face 133 of the rack 132 and the second pad 1254 is spaced apart from the second lateral face 135 of the rack 132. Because the first pad 1252 and/or the second pad 1254 are spaced apart from the first lateral face 133 and the second lateral face 135 of the rack 132, the rack 132 may translate freely in the vehicle lateral direction during ordinary vehicle operation. As the rack 132 may translate freely in the vehicle lateral direction, the steering wheel 142 (FIG. 1) that is coupled to the rack 132 through the steering column assembly 140 may freely rotate. Likewise, the front wheel 124 (FIG. 1) that is coupled to the rack 132 through the tie rod 128 may freely rotate with respect to the unibody 110.

Figure 13:
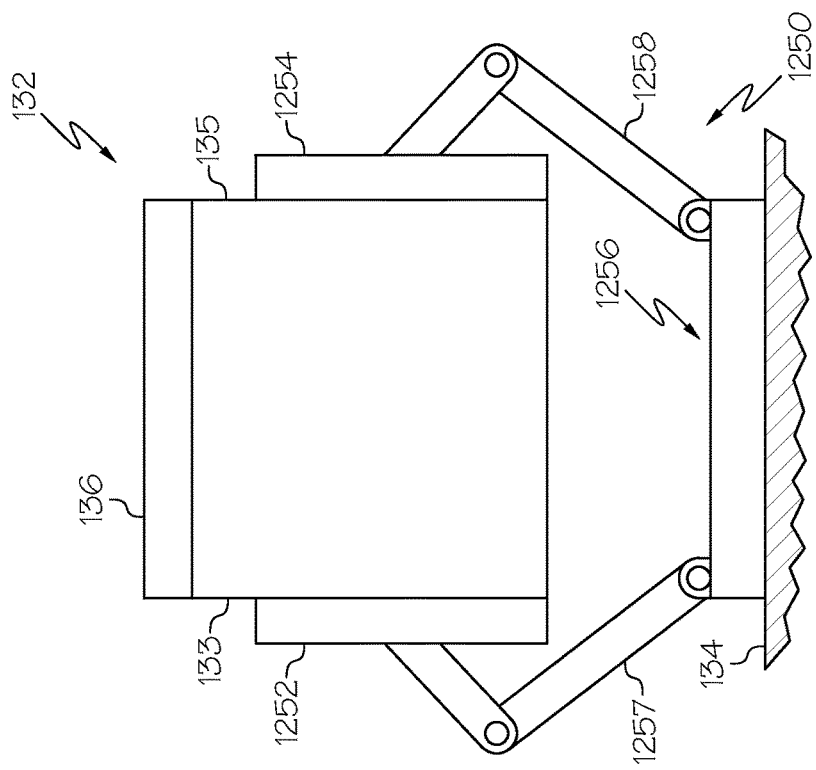
FIG. 13 schematically depicts a side view of the rack and the locking device of FIG. 12 in an activated configuration according to one or more embodiments shown or described herein.

The locking device 1250 may be changed between the deactivated configuration shown in FIG. 12 and an activated configuration, as shown in FIG. 13. As described hereinabove, in the deactivated configuration, at least a portion of the locking device 1250 is detached and spaced apart from the rack 132. To change between the deactivated configuration and the activated configuration, the first arm 1257 and/or the second arm 1258 pivot with respect to the stationary portion 1256 such that the first pad 1252 and/or the second pad 1254 move toward the rack 132 in the vehicle longitudinal direction. In the activated configuration, at least a portion of the locking device 1250 is engaged with the rack 132. In some embodiments, the first pad 1252 engages and contacts the first lateral face 133 of the rack 132 and/or the second pad 1254 engages and contacts the second lateral face 135 of the rack 132 in the activated configuration.

As described hereinabove, the stationary portion 1256 of the locking device 1250 is coupled to the unibody 110 through the housing 134. Because the locking device 1250 is coupled to the unibody 110, when first pad 1252 and/or the second pad 1254 of the locking device 1250 engages and contacts the first lateral face 133 and/or the second lateral face 135 of the rack 132, the locking device 1250 forms a generally rigid connection between the rack 132 and the unibody 110 of the vehicle 100. In particular, frictional forces associated with contact between the first pad 1252 and/or the second pad 1254 and the first lateral face 133 and/or the second lateral face 135 of the rack 132 form a generally rigid connection between the rack 132 and the unibody 110 of the vehicle. Accordingly, when the locking device 1250 is in the activated configuration, the locking device 1250 prevents translation of the rack 132 of the steering rack assembly 130 with respect to the unibody 110 in the vehicle lateral direction. Further, by engaging the first lateral face 133 and/or the second lateral face 135 of the rack 132, the locking device 1250 may prevent translation of the rack 132 without engaging the teeth 136 of the rack 132, such that the locking device 1250 may prevent translation in steering systems that include racks or track rods that do not include teeth. It should be understood that the first pad 1252 and/or the second pad 1254 may be formed from materials suitable for applying frictional force to the rack 132 including, but not limited to, metals, composites, glass composites, rubber, high-heat resins, kevlar, or the like. The locking device 1250 may be changed from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the rack 132 through the tie rod 128. Accordingly, when the locking device 1250 is in the activated configuration, the locking device 1250 maintains the orientation of the front wheel 124 with respect to the unibody 110 of the vehicle 100 and prevents rotation of the front wheel 124 about the axis 200. Likewise, as noted hereinabove, the steering column assembly 140 and the steering wheel 142 are coupled to the rack 132 through the pinion gear 144. Accordingly, when the locking device 1250 is in the activated configuration, the locking device 1250 prevents rotation of the steering wheel 142.

Figure 14:
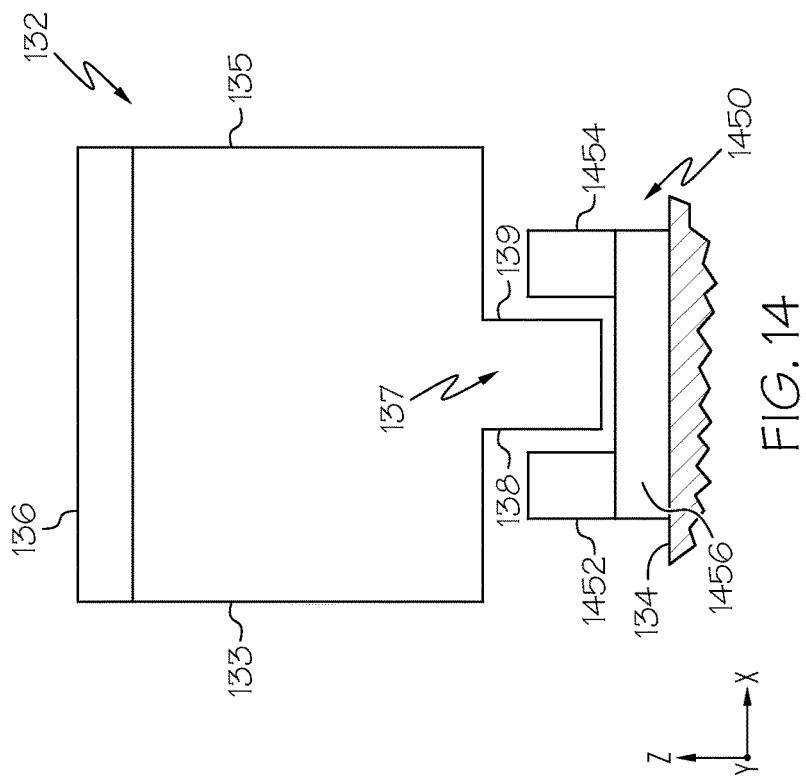
FIG. 14 schematically depicts a side view of a rack and a locking device in a deactivated configuration according to one or more embodiments shown or described herein.

Referring to FIG. 14, a side view of another embodiment of a locking device 1450 and the rack 132 is depicted. During ordinary vehicle operation, the locking device 1450 is in a deactivated configuration, as shown in FIG. 14, and at least a portion of the locking device 1450 is spaced apart and detached from the rack 132. The locking device 1450 includes a first pad 1452 and/or a second pad 1454, and a stationary portion 1456. The stationary portion 1456 is coupled to the housing 134 of the steering rack assembly 130, thereby coupling the stationary portion 1456 to the unibody 110 of the vehicle 100. The stationary portion 1456 of the locking device 1450 is positioned beneath and spaced apart from the rack 132 such that the stationary portion 1456 does not interfere with translation of the rack 132 in the vehicle lateral direction during ordinary vehicle operation. Alternatively, the stationary portion 1456 of the locking device 750 may be positioned forward or rearward of the rack 132 in the vehicle longitudinal direction.

The first pad 1452 and/or the second pad 1454 of the locking device 1450 are coupled to the stationary portion 1456 and are spaced apart from the rack 132 in the deactivated configuration. The first pad 1452 and/or the second pad 1454 of the locking device 1450 are moveably coupled to the stationary portion 1456 such that the first pad 1452 and/or the second pad 1454 move in the vehicle longitudinal direction with respect to the stationary portion 1456. While the first pad 1452 and/or the second pad 1454 are moveable with respect to the stationary portion 1456 in the vehicle longitudinal direction, the first pad 1452 and/or the second pad 1454 are coupled to the stationary portion 1456 such that the position of the first pad 1452 and/or the second pad 1454 is generally fixed in the vehicle lateral direction.

In some embodiments, the rack 132 includes an engagement feature 137 that extends downward from the rack 132 in the vehicle vertical direction. The engagement feature 137 includes a first engagement face 138 that is oriented to face forward in the vehicle longitudinal direction and a second engagement face 139 that is oriented to face rearward in the vehicle longitudinal direction. Alternatively, the rack 132 may include an engagement feature that extends forward or rearward of the rack in the vehicle longitudinal direction, and the first and second engagement faces may be oriented to face upward and downward in the vehicle vertical direction, respectively.

The first pad 1452 is spaced apart from the first engagement face 138 of the rack 132 and the second pad 1454 is spaced apart from the second engagement face 139 of the rack 132 while the locking device 1450 is in the deactivated configuration. Because the first pad 1452 and/or the second pad 1454 are spaced apart from the first engagement face 138 and the second engagement face 139 of the rack 132, the rack 132 may translate freely in the vehicle lateral direction during ordinary vehicle operation. As the rack 132 may translate freely in the vehicle lateral direction, the steering wheel 142 (FIG. 1) that is coupled to the rack 132 through the steering column assembly 140 may freely rotate. Likewise, the front wheel 124 (FIG. 1) that is coupled to the rack 132 through the tie rod 128 may freely rotate with respect to the unibody 110.

Figure 15:
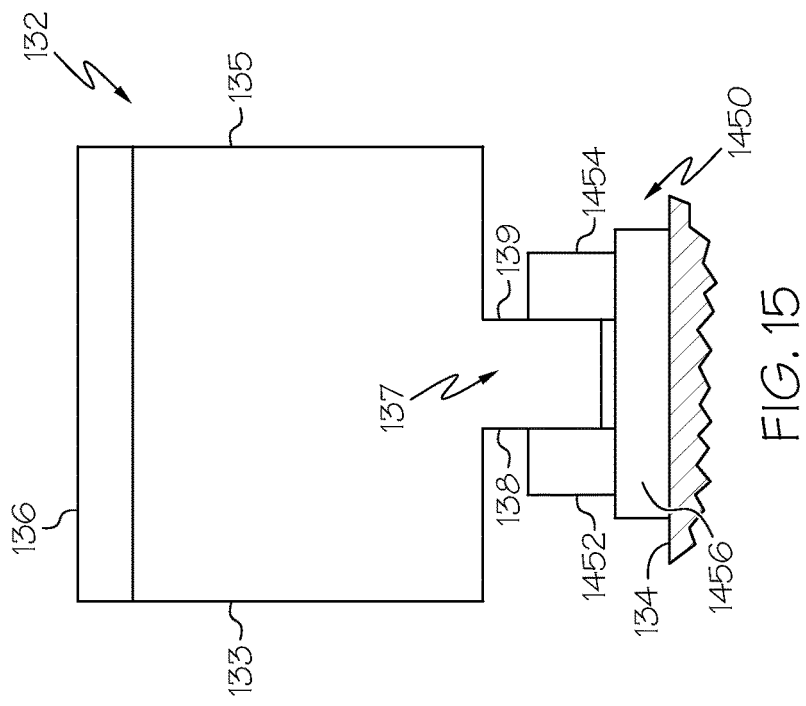
FIG. 15 schematically depicts a side view of the rack and the locking device of FIG. 14 in an activated configuration according to one or more embodiments shown or described herein.

The locking device 1450 may be changed between the deactivated configuration shown in FIG. 14 and an activated configuration, as shown in FIG. 15. As described hereinabove, in the deactivated configuration, at least a portion of the locking device 1450 is detached and spaced apart from the rack 132. To change between the deactivated configuration and the activated configuration, the first pad 1452 and/or the second pad 1454 move in the vehicle longitudinal direction toward the rack 132. In the activated configuration, at least a portion of the locking device 1450 is engaged with the rack 132. In some embodiments, the first pad 1452 engages and contacts the first engagement face 138 of the rack 132 and/or the second pad 1454 engages and contacts the second engagement face 139 of the rack 132 in the activated configuration.

As described hereinabove, the stationary portion 1456 of the locking device 1450 is coupled to the unibody 110 through the housing 134. Because the locking device 1450 is coupled to the unibody 110, when first pad 1452 and/or the second pad 1454 of the locking device 1450 engages and contacts the first engagement face 138 and/or the second engagement face 139 of the rack 132, the locking device 1450 forms a generally rigid connection between the rack 132 and the unibody 110 of the vehicle 100. In particular, frictional forces associated with contact between the first pad 1452 and/or the second pad 1454 and the first engagement face 138 and/or the second engagement face 139 of the rack 132, respectively, may form a generally rigid connection between the rack 132 and the unibody 110 of the vehicle. Accordingly, when the locking device 1450 is in the activated configuration, the locking device 1450 prevents translation of the rack 132 of the steering rack assembly 130 with respect to the unibody 110 in the vehicle lateral direction. Further, by engaging the first engagement face 138 and/or the second engagement face 139 of the rack 132, the locking device 1450 prevents translation of the rack 132 without engaging the teeth 136 of the rack 132, such that the locking device 1450 may prevent translation in steering systems that include racks or track rods that do not include teeth. It should be understood that the first pad 1452 and/or the second pad 1454 may be formed from materials suitable for applying frictional force to the rack 132 including, but not limited to, metals, composites, glass composites, rubber, high-heat resins, kevlar, or the like. The locking device 1450 may be changed from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the rack 132 through the tie rod 128. Accordingly, when the locking device 1450 is in the activated configuration, the locking device 1450 maintains the orientation of the front wheel 124 with respect to the unibody 110 of the vehicle 100 prevents rotation of the front wheel 124 about the axis 200. Likewise, as noted hereinabove, the steering column assembly 140 and the steering wheel 142 are coupled to the rack 132 through the pinion gear 144. Accordingly, when the locking device 1450 is in the activated configuration, the locking device 1450 prevents rotation of the steering wheel 142.

Figure 16:
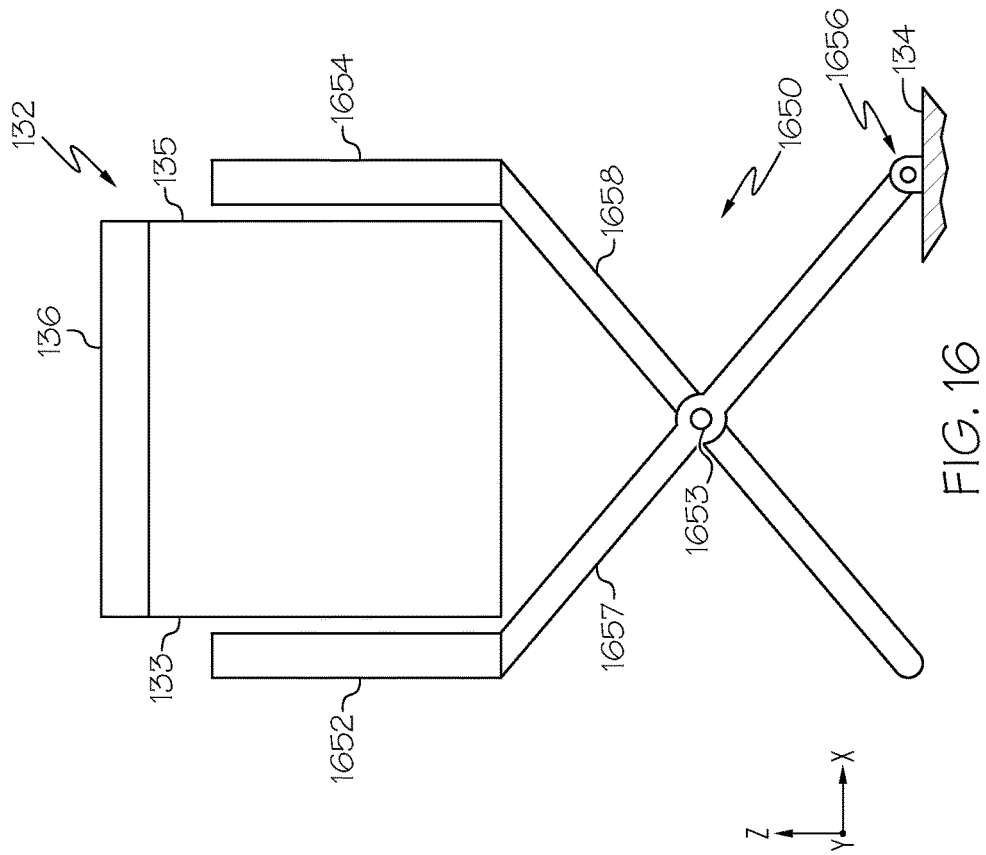
FIG. 16 schematically depicts a side view of a rack and a locking device in a deactivated configuration according to one or more embodiments shown or described herein.

Referring to FIG. 16, a side view of another embodiment of a locking device 1650 and the rack 132 is depicted. During ordinary vehicle operation, the locking device 1650 is in a deactivated configuration, as shown in FIG. 16, and at least a portion of the locking device 1650 is spaced apart and detached from the rack 132. The locking device 1650 includes a first pad 1652 and/or a second pad 1654, and a stationary portion 1656. The stationary portion 1656 is coupled to the housing 134 of the steering rack assembly 130, thereby coupling the stationary portion 1656 to the unibody 110 of the vehicle 100. The stationary portion 1656 of the locking device 750 is positioned beneath and spaced apart from the rack 132 such that the stationary portion 1656 does not interfere with translation of the rack 132 in the vehicle lateral direction during ordinary vehicle operation. Alternatively, the stationary portion 1656 of the locking device 1650 may be positioned above and spaced apart from the rack 132 in the vehicle vertical direction.

The first pad 1652 and/or the second pad 1654 of the locking device 1650 are coupled to the stationary portion 1656 and are spaced apart from the rack 132 in the deactivated configuration. The first pad 1652 and/or the second pad 1654 of the locking device 1650 are pivotally coupled to the stationary portion 1656. In particular, the first pad 1652 is coupled to a first arm 1657 that is pivotally coupled to the stationary portion 1656. The second pad 1654 is coupled to a second arm 1658 that is pivotally coupled to the first arm 1657 at a joint 1653. The first arm 1657 is pivotally coupled to the stationary portion 1656 and the second arm 1658 such that the first pad 1652 and/or the second pad 1654 move in the vehicle longitudinal direction with respect to the stationary portion 1656. While the first pad 1652 and/or the second pad 1654 are moveable with respect to the stationary portion 1656 in the vehicle longitudinal direction, the first pad 1652 and/or the second pad 1654 are coupled to the stationary portion 1656 such that the position of the first pad 1652 and/or the second pad 1654 is generally fixed in the vehicle lateral direction. While the first arm 1657 is described and depicted as being pivotally coupled to the stationary portion 1656, it should be understood that the joint 1653 may alternatively be pivotally coupled to the stationary portion 1656, such that both the first arm 1657 and the second arm 1658 are pivotally coupled to the stationary portion 1656.

In some embodiments, the first pad 1652 is spaced apart from the first lateral face 133 of the rack 132 and the second pad 1654 is spaced apart from the second lateral face 135 of the rack 132 while the locking device 1650 is in the deactivated configuration. Because the first pad 1652 and/or the second pad 1654 are spaced apart from the first lateral face 133 and the second lateral face 135 of the rack 132, the rack 132 may translate freely in the vehicle lateral direction during ordinary vehicle operation. As the rack 132 may translate freely in the vehicle lateral direction, the steering wheel 142 (FIG. 1) that is coupled to the rack 132 through the steering column assembly 140 may freely rotate. Likewise, the front wheel 124 (FIG. 1) that is coupled to the rack 132 through the tie rod 128 may freely rotate with respect to the unibody 110.

Figure 17:
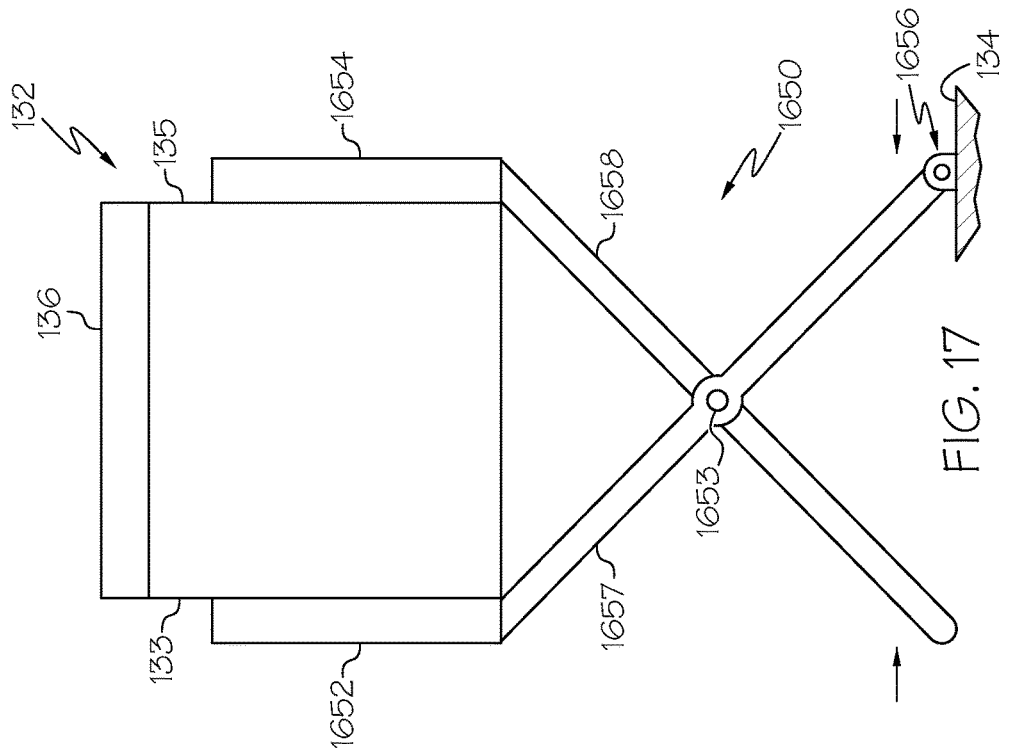
FIG. 17 schematically depicts a side view of the rack and the locking device of FIG. 16 in an activated configuration according to one or more embodiments shown or described herein.

The locking device 1650 may be changed between the deactivated configuration shown in FIG. 16 and an activated configuration, as shown in FIG. 17. As described hereinabove, in the deactivated configuration, at least a portion of the locking device 1650 is detached and spaced apart from the rack 132. To change between the deactivated configuration and the activated configuration, the first arm 1657 pivots about the stationary portion 1656 and the second arm 1658 pivots about the joint 1653 such that the first pad 1652 and/or the second pad 1654 move in the vehicle longitudinal direction toward the rack 132. In the activated configuration, at least a portion of the locking device 1650 is engaged with the rack 132. In some embodiments, the first pad 1652 engages and contacts the first lateral face 133 of the rack 132 and/or the second pad 1654 engages and contacts the second lateral face 135 of the rack 132 in the activated configuration.

As described hereinabove, the stationary portion 1656 of the locking device 1650 is coupled to the unibody 110 through the housing 134. Because the locking device 1650 is coupled to the unibody 110, when first pad 1652 and/or the second pad 1654 of the locking device 1650 engages and contacts the first lateral face 133 and/or the second lateral face 135 of the rack 132, the locking device 1650 forms a generally rigid connection between the rack 132 and the unibody 110 of the vehicle 100. In particular, frictional forces associated with contact between the first pad 1652 and/or the second pad 1654 and the first lateral face 133 and/or the second lateral face 135 of the rack 132, respectively, may form a generally rigid connection between the rack 132 and the unibody 110 of the vehicle. Accordingly, when the locking device 1650 is in the activated configuration, the locking device 1650 prevents translation of the rack 132 of the steering rack assembly 130 with respect to the unibody 110 in the vehicle lateral direction. Further, by engaging the first lateral face 133 and/or the second lateral face 135 of the rack 132, the locking device 1650 prevents translation of the rack 132 without engaging the teeth 136 of the rack 132, such that the locking device 1650 may prevent translation in steering systems that include racks or track rods that do not include teeth. It should be understood that the first pad 1652 and/or the second pad 1654 may be formed from materials suitable for applying frictional force to the rack 132 including, but not limited to, metals, composites, glass composites, rubber, high-heat resins, kevlar, or the like. The locking device 1650 may be changed from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the rack 132 through the tie rod 128. Accordingly, when the locking device 1650 is in the activated configuration, the locking device 1650 maintains the orientation of the front wheel 124 with respect to the unibody 110 of the vehicle 100 prevents rotation of the front wheel 124 about the axis 200. Likewise, as noted hereinabove, the steering column assembly 140 and the steering wheel 142 are coupled to the rack 132 through the pinion gear 144. Accordingly, when the locking device 1650 is in the activated configuration, the locking device 1650 prevents rotation of the steering wheel 142.

Figure 18:
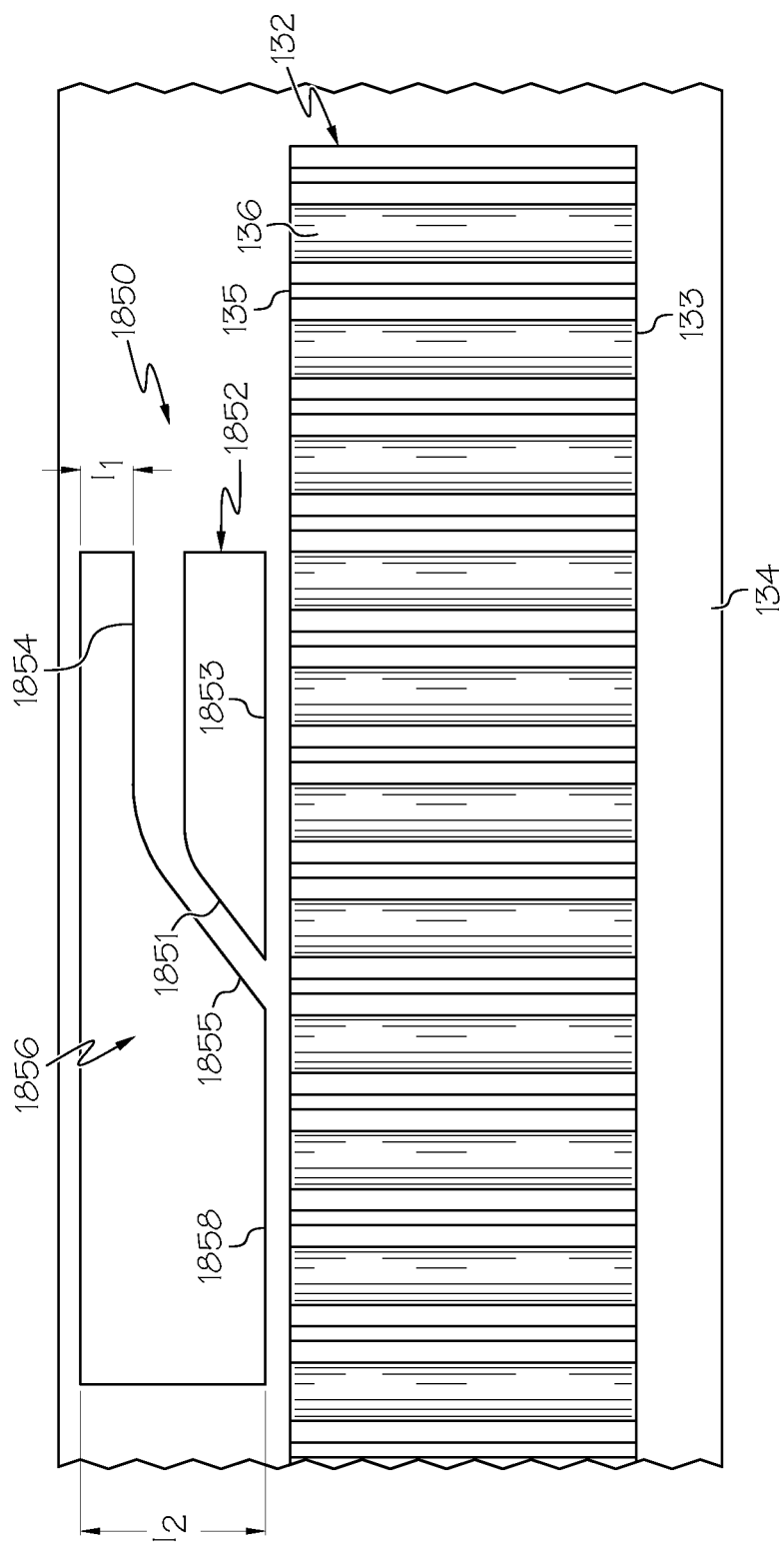
FIG. 18 schematically depicts a top view of a rack and a locking device in a deactivated configuration according to one or more embodiments shown or described herein.

Referring to FIG. 18, a top view of another embodiment of a locking device 1850 and the rack 132 is depicted. During ordinary vehicle operation, the locking device 1850 is in a deactivated configuration, as shown in FIG. 18, and at least a portion of the locking device 1850 is spaced apart and detached from the rack 132. The locking device 1850 includes a wedge portion 1852 and a stationary portion 1856. The stationary portion 1856 is coupled to the housing 134 of the steering rack assembly 130, thereby coupling the stationary portion 1856 to the unibody 110 of the vehicle 100. The stationary portion 1856 of the locking device 1450 is positioned rearward and spaced apart from the rack 132 in the vehicle longitudinal direction such that the stationary portion 1856 does not interfere with translation of the rack 132 in the vehicle lateral direction during ordinary vehicle operation. Alternatively, the stationary portion 1856 of the locking device 750 may be positioned forward of and spaced apart from the rack 132 in the vehicle longitudinal direction.

The stationary portion 1856 includes an engagement face 1855. In embodiments, the engagement face is a tapered face that extends between a narrow portion 1854 and a wide portion 1858 of the stationary portion 1856 in the vehicle lateral direction. In such embodiments, the narrow portion 1854 has a length $l_1$ and the wide portion 1858 has a length $l_2$ as evaluated in the vehicle longitudinal direction, where $l_2$ is greater than $l_1$. Alternatively, the length of the stationary portion 1856 may be generally uniform as evaluated in the vehicle longitudinal direction, and the engagement face 1855 may be oriented to face forward in the vehicle longitudinal direction.

The wedge portion 1852 of the locking device 1850 is detached and spaced apart from the stationary portion 1856 in the deactivated configuration. The wedge portion 1852 is coupled to the housing 134 and/or the stationary portion 1856 such that the wedge portion 1852 is moveable in the vehicle longitudinal and the vehicle lateral directions. The wedge portion 1852 includes a wedge face 1851 and a rack engagement face 1853. The wedge face 1851 is detached and spaced apart from the engagement face 1855 of the stationary portion 1856 in the deactivated configuration. The rack engagement face 1853 is oriented to face the second lateral face 135 of the rack 132 and is detached and spaced apart from the second lateral face 135 in the vehicle longitudinal direction in the deactivated configuration. As the rack engagement face 1853 and the wedge portion 1852 are spaced apart from the second lateral face 135 of the rack 132, the rack 132 may translate freely in the vehicle lateral direction during ordinary vehicle operation. As the rack 132 may translate freely in the vehicle lateral direction, the steering wheel 142 (FIG. 1) that is coupled to the rack 132 through the steering column assembly 140 may freely rotate. Likewise, the front wheel 124 (FIG. 1) that is coupled to the rack 132 through the tie rod 128 may freely rotate with respect to the unibody 110.

Figure 19:
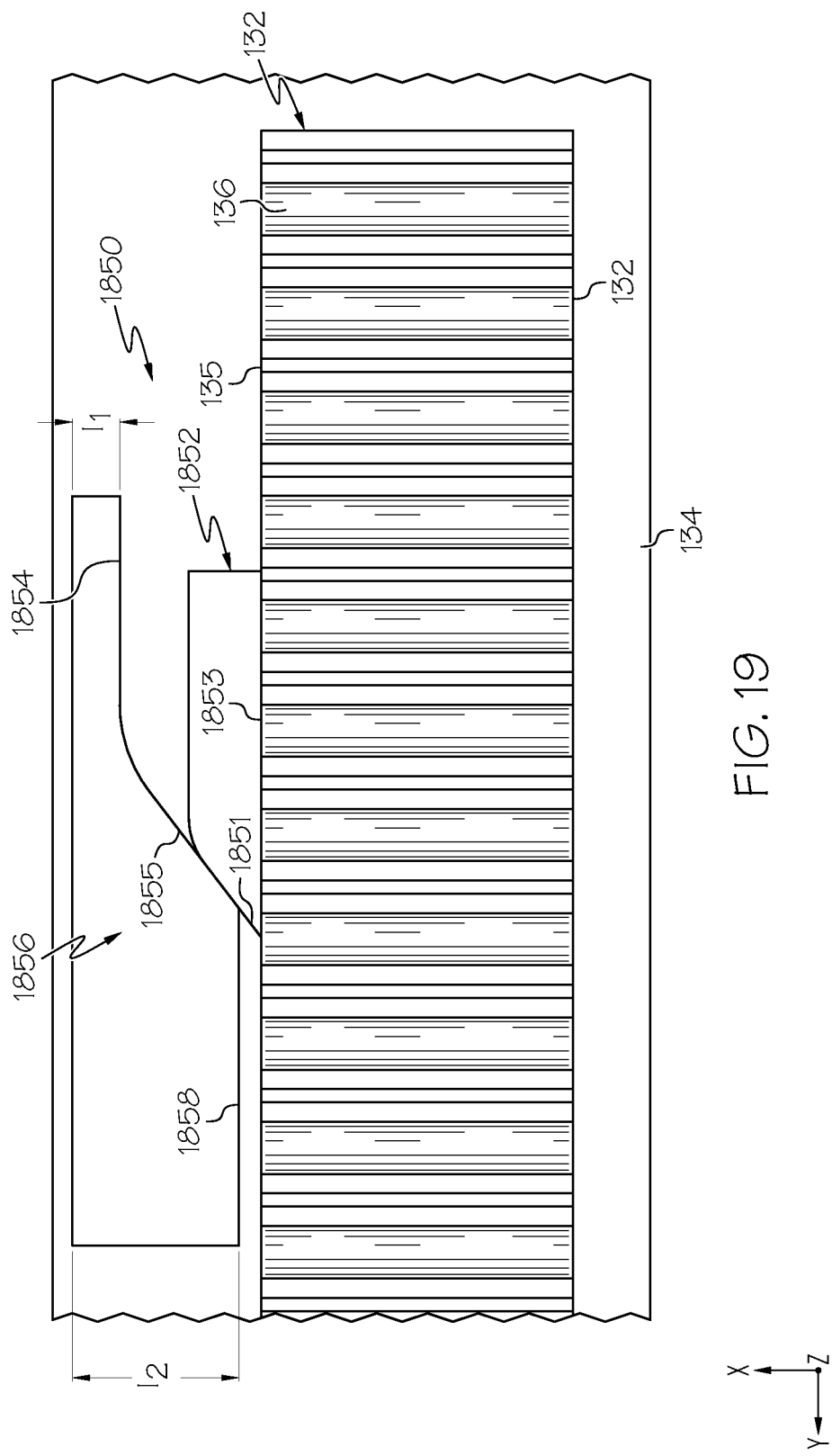
FIG. 19 schematically depicts a top view of the rack and the locking device of FIG. 18 in an activated configuration according to one or more embodiments shown or described herein.

The locking device 1850 may be changed between the deactivated configuration shown in FIG. 18 and an activated configuration, as shown in FIG. 19. As described hereinabove, in the deactivated configuration, at least a portion of the locking device 1850 is detached and spaced apart from the rack 132. To change between the deactivated configuration and the activated configuration, the wedge portion 1852 is moved toward the engagement face 1855 of the stationary portion 1856. In the activated configuration, at least a portion of the locking device 1850 is engaged with the rack 132. In some embodiments, the rack engagement face 1853 of the wedge portion 1852 contacts and engages the second lateral face 135 of the rack 132 in the activated configuration.

In particular, to change between the deactivated configuration and the activated configuration, the wedge portion 1852, and more particularly the wedge face 1851 moves toward the engagement face 1855 of the stationary portion 1856 in the vehicle lateral direction until the wedge face 1851 contacts and engages the engagement face 1855. In embodiments, such as the embodiment depicted in FIGS. 18 and 19, the wedge face 1851 has a tapered wedge shape. Accordingly, as the wedge portion 1852 is moved in the vehicle lateral direction toward the stationary portion 1856, contact and engagement between the wedge face 1851 and the engagement face 1855 encourages the wedge portion 1852 to move toward the rack 132 in the vehicle longitudinal direction. The engagement face 1855 includes a tapered shape that corresponds to the wedge face 1851 to facilitate movement of the wedge portion 1852 toward the rack 132 in the vehicle longitudinal direction. Alternatively, the engagement face 1855 may include a generally planar surface that extends in the vehicle lateral direction, and movement of the wedge portion 1852 toward the rack 132 in the vehicle longitudinal direction is encouraged primarily as a result of the wedge shape of the wedge face 151.

As the wedge portion 1852 is encouraged to move toward the rack 132 in the vehicle longitudinal direction, the rack engagement face 1853 contacts and engages the second lateral face 135 of the rack 132. It should be understood that the stationary portion 1856 and the wedge portion 1852 may be positioned forward of the rack 132 in the vehicle longitudinal direction and the rack engagement face 1853 may contact and engage the first lateral face 133 of the rack 132 in the activated configuration.

Accordingly, in the engaged configuration, the wedge portion 1852 simultaneously contacts and engages the stationary portion 1856 and the rack 132. As described hereinabove, the stationary portion 1856 of the locking device 1850 is coupled to the unibody 110 through the housing 134. Because the locking device 1850 is coupled to the unibody 110, when wedge portion 1852 engages and contacts the second lateral face 135 of the rack 132 and the stationary portion 1856, the locking device 1850 forms a generally rigid connection between the rack 132 and the unibody 110 of the vehicle 100. In particular, frictional forces associated with contact between the wedge portion 1852 and the second lateral face 135 of the rack 132 may form a generally rigid connection between the rack 132 and the unibody 110 of the vehicle. Further, the tapered wedge shape of the wedge face 1851 may form a mechanical wedge that applies force to the second lateral face 135 of the rack 132 in the vehicle longitudinal direction as the wedge portion 1852 is moved toward the stationary portion 1856 in the vehicle lateral direction, thereby increasing the frictional forces associated with contact between the rack engagement face 1853 and the second lateral face 135 of the rack 132. Accordingly, when the locking device 1850 is in the activated configuration, the locking device 1850 prevents translation of the rack 132 of the steering rack assembly 130 with respect to the unibody 110 in the vehicle lateral direction. Further, by engaging the second lateral face 135 of the rack 132, the locking device 1850 prevents translation of the rack 132 without engaging the teeth 136 of the rack 132, such that the locking device 1850 may prevent translation in steering systems that include racks or track rods that do not include teeth. It should be understood that the wedge portion 1852 may be formed from materials suitable for applying frictional force to the rack 132 including, but not limited to, metals, composites, glass composites, rubber, high-heat resins, kevlar, or the like. The locking device 1850 may be changed from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the rack 132 through the tie rod 128. Accordingly, when the locking device 1850 is in the activated configuration, the locking device 1850 maintains the orientation of the front wheel 124 with respect to the unibody 110 of the vehicle 100 prevents rotation of the front wheel 124 about the axis 200. Likewise, as noted hereinabove, the steering column assembly 140 and the steering wheel 142 are coupled to the rack 132 through the pinion gear 144. Accordingly, when the locking device 1850 is in the activated configuration, the locking device 1850 prevents rotation of the steering wheel 142.

While the locking devices 150, 550, 750, 1050, 1250, 1450, 1650, 1850 are described and depicted herein as including a locking device that is detached and spaced apart from the rack 132 in the deactivated configuration, it should be understood that the locking device may include devices that are engaged or at least partially engaged with the rack 132 in the deactivated configuration as well as in the activated configuration. In such embodiments, the locking device may similarly prevent translation of the rack 132 in the activated configuration, while allowing the rack 132 to translate freely in the deactivated configuration.

Figure 20:
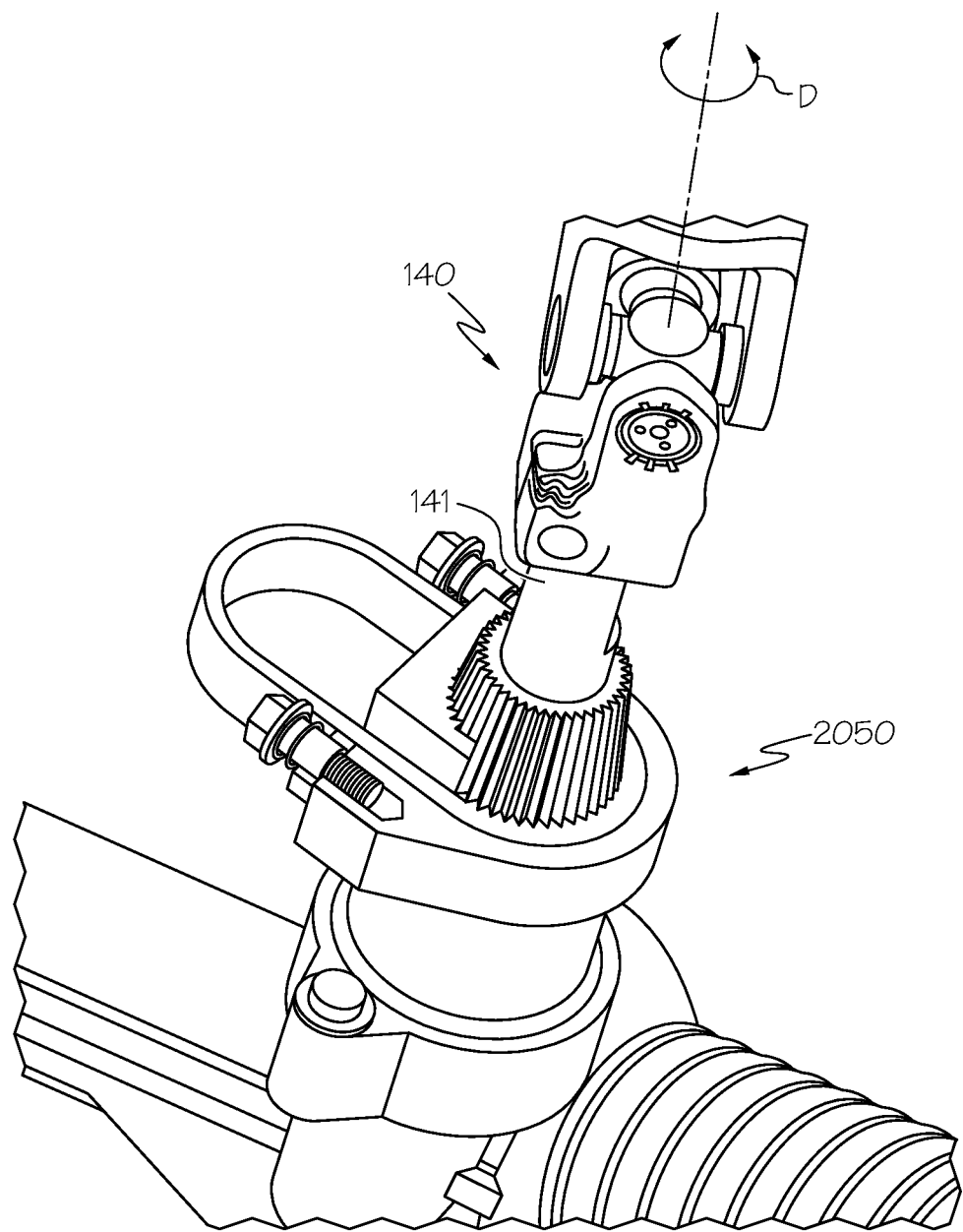
FIG. 20 schematically depicts a perspective view of a steering column and a locking device according to one or more embodiments shown or described herein.

Referring now to FIG. 20, the steering column assembly 140 is shown in isolation with another embodiment of the locking device 2050. The embodiment of the locking device 2050 depicted in FIG. 20 is described in U.S. Pat. No. 8,281,684, which is hereby incorporated by reference in its entirety. As shown in FIG. 20, the locking device 2050 may be placed around a periphery of the steering column assembly 140.

Figure 21:
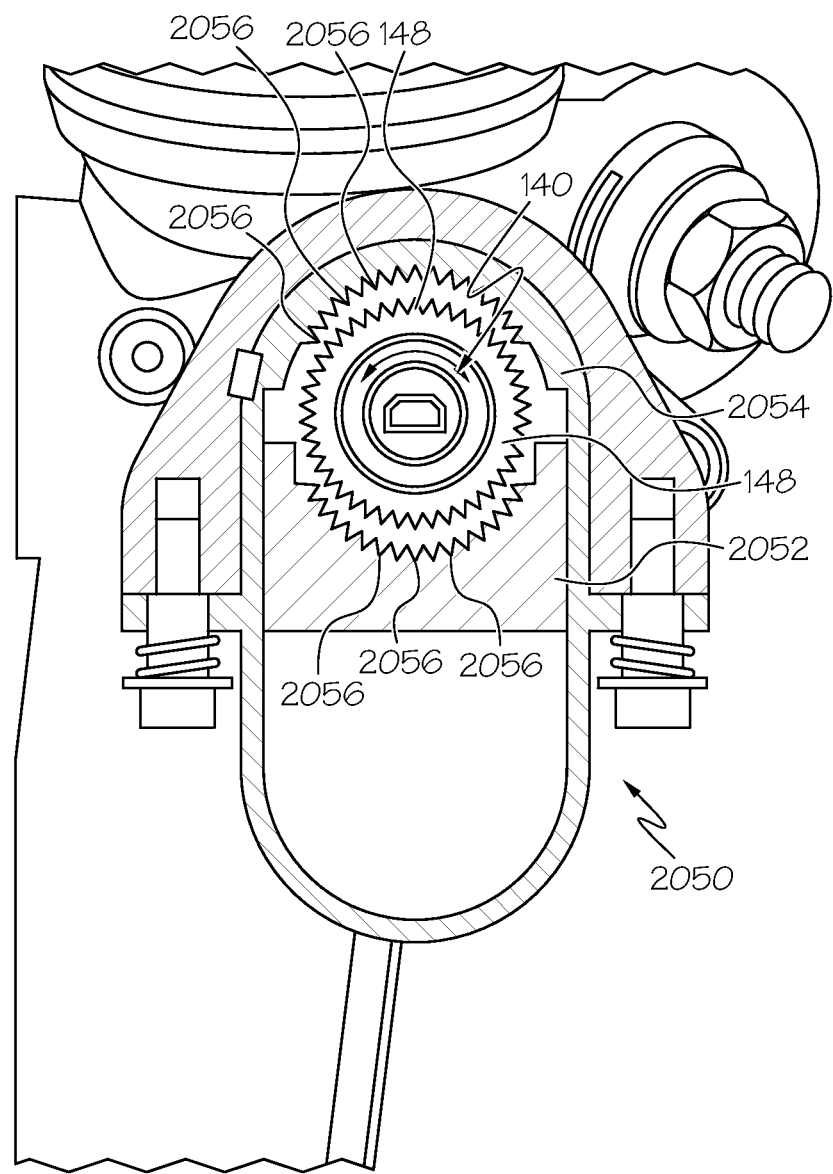
FIG. 21 schematically depicts a top view of a steering column and a locking device in a deactivated configuration according to one or more embodiments shown or described herein.

Referring to FIG. 21, a top view of the steering column assembly 140 and the locking device 2050 is depicted. In some embodiments, such as the embodiment depicted in FIG. 8, the locking device 750 may be coupled to the unibody 110. The locking device 2050 may be coupled to the unibody 110 such that a position of the locking device 2050 is generally fixed with respect to the unibody 110.

During normal vehicle operation, such as depicted in FIG. 21, the locking device 2050 is in a deactivated configuration, and at least a portion of the locking device 2050 is detached and spaced apart from the steering column assembly 140. The locking device 2050 may include at a locking portion 2052 and a stationary portion 2054. The stationary portion 2054 of the locking device 2050 may be coupled to the unibody 110 of the vehicle 100 such that a position of the stationary portion 2054 of the locking device 2050 is generally fixed with respect to the unibody 110.

The locking portion 2052 is coupled to the stationary portion 2054 of the locking device 750 and is spaced apart from the steering column assembly 140 in the deactivated configuration. The stationary portion 2054 and the locking portion 2052 of the locking device 2050 may include a plurality of teeth 2056 that face in a radially inward direction toward the steering column assembly 140. The plurality of teeth 2056 of the locking portion 2052 and the stationary portion 2054 are engageable with a toothed ring 148 that is coupled to the steering column assembly 140. The plurality of teeth 2056 of the locking device 2050 may be spaced apart and detached from the toothed ring 148 of the steering column assembly 140 when the locking device 2050 in the deactivated configuration. Because the plurality of teeth 2056 of the locking device 2050 is spaced apart and detached from the toothed ring 148 of the steering column assembly 140, when the locking device 2050 is in the deactivated configuration, the steering column assembly 140 may freely rotate. As the steering column assembly 140 may freely rotate, the steering wheel 142 that is coupled to the steering column assembly 140 may freely rotate. Likewise, the front wheel 124 that is coupled to the steering column assembly 140 through the rack 132 and the tie rod 128 may freely rotate with respect to the unibody 110.

Figure 22:
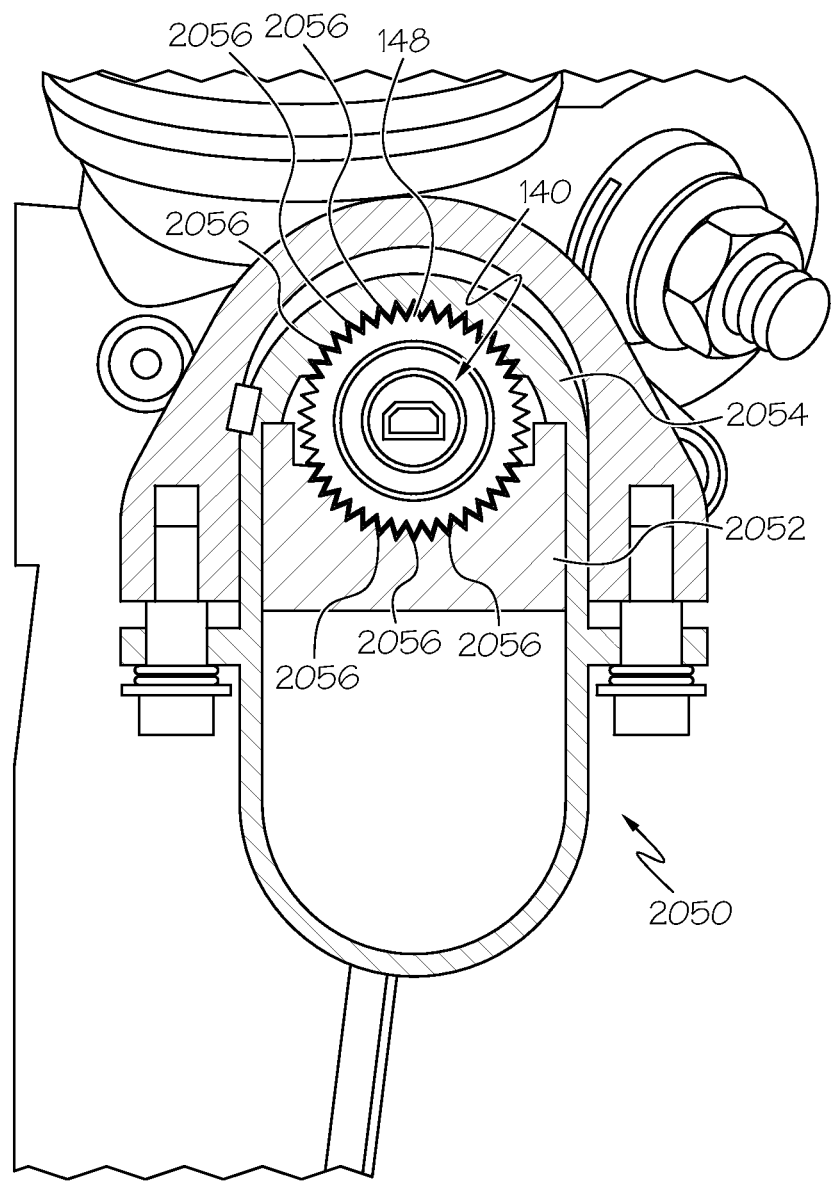
FIG. 22 schematically depicts a top view of a steering column and a locking device in an activated configuration according to one or more embodiments shown or described herein.

The locking device 2050 may change between the deactivated configuration shown in FIG. 21 and an activated configuration, as shown in FIG. 22. As described hereinabove, in the deactivated configuration, at least a portion of the locking device 2050 is detached and spaced apart from the steering column assembly 140. In the activated configuration, at least a portion of the locking device 2050 is engaged with the steering column assembly 140. The locking portion 2052 of the locking device 2050 may translate in a radially inward direction toward the steering column assembly 140. The locking portion 2052 contacts the toothed ring 148 of the steering column assembly 140 and compresses the toothed ring 148 between the locking portion 2052 and the stationary portion 2054 of the locking device 2050. As the locking portion 2052 compresses the toothed ring 148, the plurality of teeth 2056 of the locking portion 2052 and the stationary portion 2054 engage the toothed ring 148 of the steering column assembly 140. As described hereinabove, the stationary portion 2054 of the locking device 2050 is coupled to the unibody 110 of the vehicle. Accordingly, by engaging the toothed ring 148 of the steering column assembly 140, the locking device 2050 forms a generally rigid connection between steering column assembly 140 and the unibody 110 of the vehicle 100. As such, when the locking device 2050 is in the activated configuration, the locking device 2050 prevents rotation of the steering column assembly 140 with respect to the unibody 110. The locking device 2050 may change from the deactivated configuration into the activated configuration by actuating devices known in the art, including, but not limited to, spring-loaded actuators, pneumatic actuators, electrically-driven motors, pyrotechnic devices, hydraulic actuators, or the like.

As described hereinabove and referring to FIG. 1, the front wheel 124 is coupled to the steering column assembly 140 through the rack 132 and the tie rod 128. Accordingly, when the locking device 2050 is in the activated configuration, the locking device 2050 may maintain the orientation of the front wheel 124 with respect to the unibody 110 of the vehicle 100 and may prevent rotation of the front wheel 124 about the axis 200. Likewise, as described hereinabove, the steering column assembly 140 is coupled to the steering wheel 142. Accordingly, when the locking device 2050 is in the activated configuration, the locking device 2050 prevents rotation of the steering wheel 142.

Figure 23:
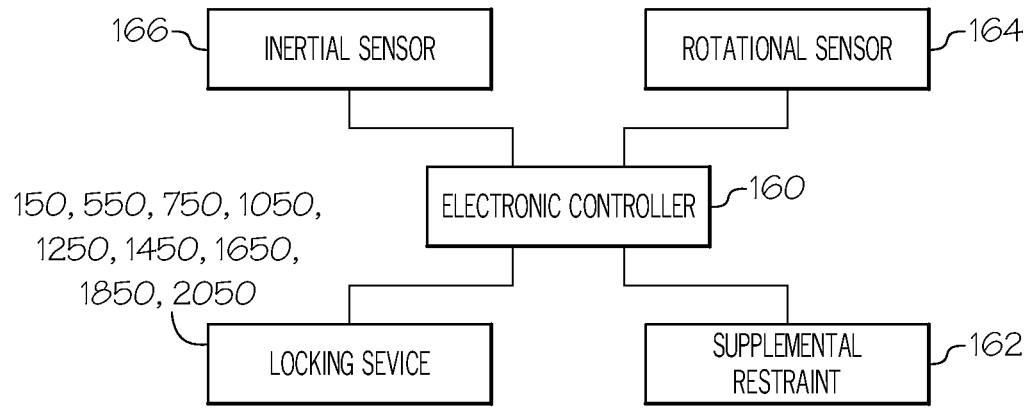
FIG. 23 schematically depicts a block diagram of a steering system of a vehicle according to one or more embodiments shown or described herein.

Referring now to FIG. 23, in embodiments, the locking devices 150, 550, 750. 1050, 1250, 1450, 1650, 1850, 2050 are communicatively coupled to an electronic controller 160. The electronic controller 160 includes a processor and a memory storing computer readable and executable instructions, which, when executed by the processor, facilitate operation of the locking devices 150, 550, 750, 1050, 1250, 1450, 1650, 1850, 2050. In particular, the electronic controller may send a signal to the locking device 150, 550, 750. 1050, 1250, 1450, 1650, 1850, 2050 to command the locking device 150, 550, 750, 1050, 1250, 1450, 1650, 1850, 2050 to change from the deactivated configuration into the activated configuration. In some embodiments, the electronic controller 160 may be a standalone controller. In some other embodiments, the electronic controller 160 may be an engine control unit, which is communicatively coupled to an internal combustion engine, such as when the vehicle 100 includes an internal combustion engine. In embodiments where the electronic controller 160 is an engine control unit, the electronic controller 160 may be responsible for controlling functions of the internal combustion engine, such as fuel flow rate and ignition timing. In still other embodiments, the electronic controller 160 may be a motor control unit communicatively coupled to an electric motor, such as when the vehicle 100 includes an electric motor (i.e., when the vehicle 100 is an electric vehicle or a hybrid vehicle). In embodiments where the electronic controller 160 is a motor control unit, the electronic controller 160 may be responsible for controlling the electric motor, such as regulating the power supplied to the motor, regenerative breaking, and the like.

The vehicle 100 may also include a supplemental restraint system 162 that is communicatively coupled to the electronic controller 160. When the electronic controller 160 executes the computer readable and executable instructions, the electronic controller 160 may facilitate operation of the supplemental restraint system 162. In particular, the electronic controller 160 sends a signal to the supplemental restraint system 162 to command the supplemental restraint system 162 to change between a deactivated configuration into an activated configuration. The supplemental restraint system 162 may include various restraint devices, including, but not limited to an airbag restraint system. In embodiments that include an airbag restraint system, when the supplemental restraint system 162 is in the deactivated configuration, the airbag restraint system may be positioned within panels and components within the cabin 108 (FIG. 1) of the vehicle 100. In such embodiments, when the supplemental restraint system 162 is changed into the activated configuration, the airbags of the airbag restraint system may be inflated.

The rotational sensor 164 is communicatively coupled to the electronic controller 160. As described hereinabove, the rotational sensor 164 may be coupled to the steering column assembly 140 and/or the steering wheel 142, such that the rotational sensor 164 may detect a rotational speed of the steering column assembly 140 and/or the steering wheel 142. The rotational sensor 164 may send signals to the electronic controller 160 that indicate a detected rotational speed of the steering column assembly 140 and/or the steering wheel 142.

An inertial sensor 166 is communicatively coupled to the electronic controller 160. The inertial sensor 166 may be coupled to the unibody 110 (FIG. 1) of the vehicle 100. The inertial sensor 166 may detect acceleration and deceleration of the inertial sensor 166. Because the inertial sensor 166 is coupled to the unibody 110 of the vehicle 100, the inertial sensor 166 may detect an acceleration and deceleration of the unibody 110 of the vehicle 100. The inertial sensor 166 may send signals to the electronic controller 160 that indicate a detected acceleration and deceleration of the unibody 110 of the vehicle 100.

When a vehicle impacts a barrier, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

In some impact configurations, the front corner of the vehicle may impact an object in what is referred to herein as a small front bumper overlap or a small overlap impact. In a small front bumper overlap impact, the impact occurs at an outboard portion of the vehicle (evaluated in a vehicle lateral direction), and only a portion of the front bumper impacts the object. In some small front bumper overlap impacts, only about 25% of the front bumper impacts the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the unibody 110 for example, may be non-symmetrically loaded when the vehicle is involved in a small overlap impact.

Referring to FIG. 1, when a front corner of the vehicle 100 impacts a barrier in a small front bumper overlap impact, energy associated with the impact may be directed into the front suspension unit 122 that is positioned proximate to the barrier. As the energy associated with the impact is directed into the front suspension unit 122, the energy may cause the front wheel 124 to rotate about axis 200 with respect to the unibody 110 of the vehicle 100. In some impact configurations, such as a small front bumper overlap impact, energy associated with the impact may cause the front suspension unit 122 to rotate about the axis 200 in a counterclockwise direction as depicted in FIG. 1 such that a rear portion of the front wheel 124 rotates inboard in the vehicle lateral direction.

Energy associated with the impact may also cause the front suspension unit 122 to plastically and elastically deform and translate generally rearward in the vehicle longitudinal direction. As the front suspension unit 122 translates rearward in the vehicle longitudinal direction, the front suspension unit 122 and the front wheel 124 may contact the cabin 108 of the vehicle 100. When the front suspension unit 122 rotates in the counterclockwise direction about the axis 200, the front wheel 124 may transmit more energy to the cabin 108 of the vehicle 100 as compared to when the front wheel 123 is maintained near a longitudinal orientation as depicted in FIG. 1.

As described hereinabove, when the front wheel 124 is rotated about the axis 200, the tie rod 128 and the rack 132 of the steering rack assembly 130 may translate in the vehicle lateral direction. As the rack 132 translates in the vehicle lateral direction, because the rack 132 is coupled to the steering column assembly 140, the steering column assembly 140 may rotate, causing the steering wheel 142 to rotate. Accordingly, energy associated with the impact may cause the steering wheel 142 to rotate through the connections between the steering wheel 142 and the front wheel 124. In some impact configurations, such as a small front bumper overlap impact, the energy associated with the impact may cause the steering wheel 142 to rotate at a relatively high rotational speed. When the steering wheel 142 rotates at a relatively high rotational speed, the rotation of the steering wheel 142 may decrease the efficiency of supplemental restraints positioned within the steering wheel 142 as compared to when the steering wheel 142 does not rotate or does not rotate at a relatively high rotational speed.

Figure 24:
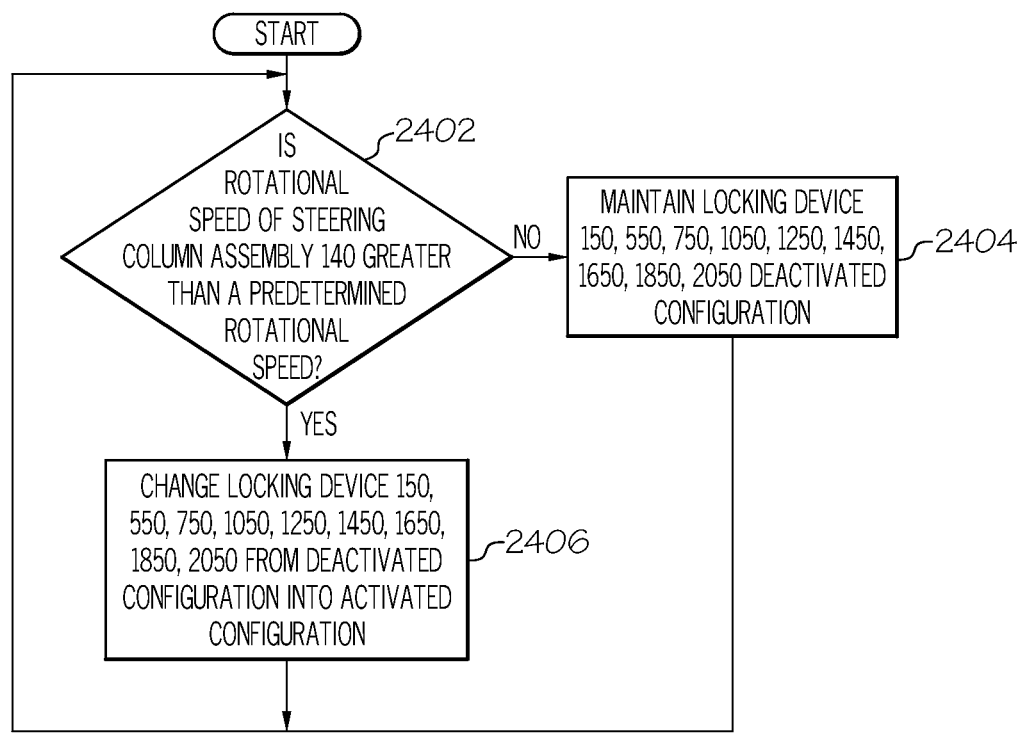
FIG. 24 schematically depicts a logic flowchart of a method of operating a steering system of a vehicle according to one or more embodiments shown or described herein.

Turning now to FIG. 24, one embodiment of a method for operating the steering system 120 is depicted. The locking device 150, 550, 750, 1050, 1250, 1450, 1650, 1850, 2050 is selectively changed between the deactivated configuration that allows operation of the steering system 120 and the activated configuration that restricts operation of the steering system 120 according to the flow chart depicted in FIG. 24. In a first step 2402, the electronic controller 160 receives a signal from the rotational sensor 164 indicating a rotational speed of the steering column assembly 140 and compares this detected rotational speed to a predetermined rotational speed. If the signal received by the electronic controller 160 indicates a rotational speed that is not greater than the predetermined rotational speed, then the electronic controller 160 proceeds to step 2404, where the electronic controller 160 commands the locking device 150, 550, 750, 1050, 1250, 1450, 1650, 1850, 2050 to remain in the deactivated configuration. If the signal received by the electronic controller 160 indicates a rotational speed that is greater than the predetermined rotational speed, then the electronic controller 160 proceeds to step 2406. At step 2406, the electronic controller 160 commands the locking device 150, 550, 750, 1050, 1250, 1450, 1650, 1850, 2050 to change from the deactivated configuration into the activated configuration.

It should be understood that the electronic controller 160 may not necessarily send a signal to command the locking device 150, 550, 750, 1050, 1250, 1450, 1650, 1850, 2050 to remain in the deactivated configuration. For example, the locking device 150, 550, 750, 1050, 1250, 1450, 1650, 1850, 2050 may remain in the deactivated configuration until a signal is sent from the electronic controller 160 to change from the deactivated configuration into the activated configuration. In other embodiments, the electronic controller 160 may send a signal to command the locking device 150, 550, 750, 1050, 1250, 1450, 1650, 1850, 2050 to remain in the deactivated configuration, and to command the locking device 150, 550, 750, 1050, 1250, 1450, 1650, 1850, 2050 to change to the activated configuration, the electronic controller 160 may cease to send a signal to the locking device 150, 550, 750, 1050, 1250, 1450, 1650, 1850, 2050. Alternatively, the electronic controller 160 may send signals to command the locking device 150, 550, 750, 1050, 1250, 1450, 1650, 1850, 2050 to both remain in the deactivated configuration and to change to the activated configuration.

As described above, when the locking devices 150, 550, 750, 1050, 1450, 1650, 1850 are in the activated configuration, the locking devices 150, 550, 750, 1050, 1450, 1650, 1850 restrict translation of the rack 132 in the vehicle lateral direction. By restricting translation of the rack 132 in the vehicle lateral direction, the locking devices 150, 550, 750, 1050, 1450, 1650, 1850 restrict rotation of the front wheel 124 with respect to the unibody 110 of the vehicle 100. Further, by restricting translation of the rack 132, the locking device 150 restricts rotation of the steering wheel 142.

As described above and as shown in FIG. 22, when the locking device 2050 is in the activated configuration, the locking device 2050 restricts rotation of the steering column assembly 140. By restricting rotation of the steering column assembly 140, the locking device 2050 restricts rotation of the front wheel 124 with respect to the unibody 110 of the vehicle 100. Further, by restricting rotation of the steering column assembly 140, the locking device 2050 restricts rotation of the steering wheel 142.

Accordingly, when the electronic controller 160 commands the locking device 150, 550, 750, 1050, 1250, 1450, 1650, 1850, 2050 to change into the activated configuration, the locking device 150, 550, 750, 1050, 1250, 1450, 1650, 1850, 2050 may restrict rotation of the front wheel 124 about the axis 200 with respect to the unibody 110 of the vehicle 100 and may restrict rotation of the steering wheel 142. By moving the locking device 150, 550, 750, 1050, 1250, 1450, 1650, 1850, 2050 into the activated configuration based on the detected rotational speed of the steering column assembly 140, the locking device 150, 550, 750, 1050, 1250, 1450, 1650, 1850, 2050 may be changed into the activated configuration during a small front bumper overlap impact.

As described hereinabove, during a small front bumper overlap impact, energy associated with the impact may cause the front wheel 124 to rotate with respect to the unibody 110 of the vehicle. Because the steering column assembly 140 is coupled to the front wheel 124 through the steering rack assembly 130 and the tie rod 128, when the front wheel 124 rotates, the steering column assembly 140 may rotate. During a small front bumper overlap impact, the rotation of the front wheel 124 may cause the steering column assembly 140 to rotate at a relatively high rotational speed. In embodiments, the predetermined rotational speed may be selected such that a detected rotational speed of the steering column assembly 140 that exceeds the predetermined rotational speed may indicate that the vehicle 100 has impacted a barrier with a small front bumper overlap. For example, in one embodiment, the predetermined rotational speed may be selected to be about 300 rotations per minute (RPM). In another embodiment, the predetermined rotational speed may be selected to be about 350 RPM. In yet another embodiment, the predetermined rotational speed may be selected to be greater than about 300 RPM and less than about 1000 RPM, inclusive of the endpoints.

By restricting rotation of the front wheel 124 during a small front bumper overlap collision, the locking device 150, 550, 750, 1050, 1250, 1450, 1650, 1850, 2050 may assist in maintaining the front wheel 124 near its original longitudinal orientation, as shown in FIG. 1. As described above, by maintaining the front wheel 124 near a longitudinal orientation during a small front bumper overlap impact, less energy associated with the impact may be transferred to the cabin 108 as compared to when the front wheel 124 is permitted to rotate.

Further, by restricting rotation of the steering wheel 142 during a small front bumper overlap impact, the locking device 150, 550, 750, 1050, 1250, 1450, 1650, 1850, 2050 may prevent or restrict rotation of the steering wheel 142. As described above, when the steering wheel 142 rotates at a relatively high rotational speed, the effectiveness of supplemental restraints that are positioned within the steering wheel 142 may decrease. Accordingly, by preventing or restricting rotation of the steering wheel 142 during a small front bumper overlap impact, the locking device 150, 550, 750, 1050, 1250, 1450, 1650, 1850, 2050 may prevent the decrease in effectiveness of the supplemental restraints that are positioned within the steering wheel 142.

Figure 25:
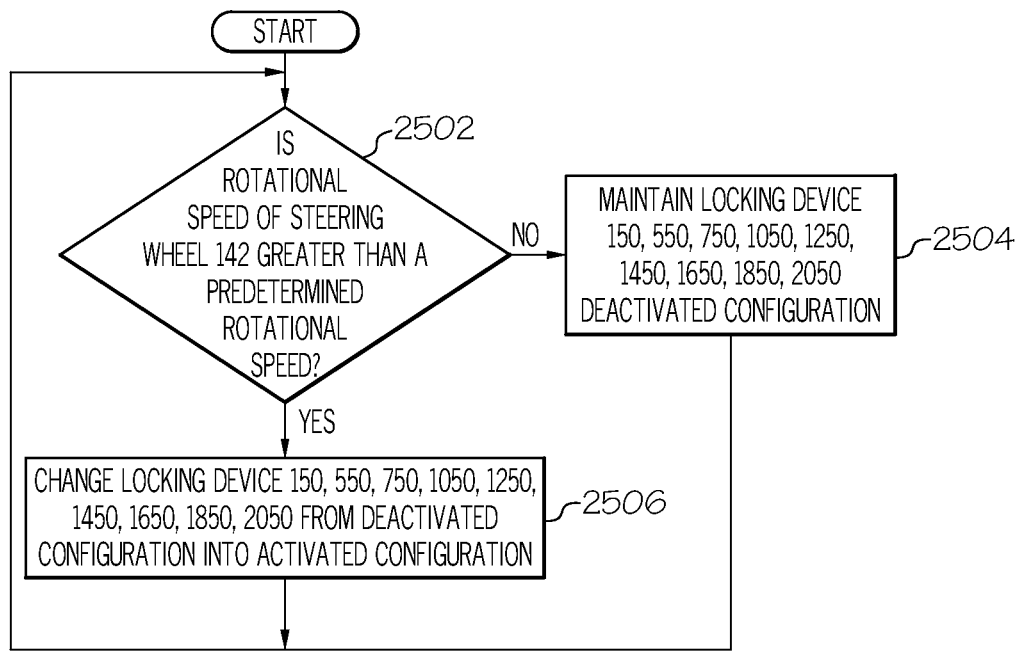
FIG. 25 schematically depicts a logic flowchart of a method of operating a steering system of a vehicle according to one or more embodiments shown or described herein.

Turning now to FIG. 25, another embodiment of a method for operating the steering system 120 is depicted. The locking device 150, 550, 750, 1050, 1250, 1450, 1650, 1850, 2050 is selectively changed between the deactivated configuration that allows operation of the steering system 120 and the activated configuration that restricts operation of the steering system 120 according to the flow chart depicted in FIG. 25. In a first step 2502, the electronic controller 160 receives a signal from the rotational sensor 164 indicating a rotational speed of the steering wheel 142 and compares this detected rotational speed to a predetermined rotational speed. If the signal received by the electronic controller 160 indicates a rotational speed that is not greater than the predetermined rotational speed, then the electronic controller 160 proceeds to step 2504, where the electronic controller 160 commands the locking device 150, 550, 750, 1050, 1250, 1450, 1650, 1850, 2050 to remain in the deactivated configuration. If the signal received by the electronic controller 160 indicates a rotational speed that is greater than the predetermined rotational speed, then the electronic controller 160 proceeds to step 2506. At step 2506, the electronic controller 160 commands the locking device 150, 550, 750, 1050, 1250, 1450, 1650, 1850, 2050 to change from the deactivated configuration into the activated configuration.

It should be understood that the electronic controller 160 may not necessarily send a signal to command the locking device 150, 550, 750, 1050, 1250, 1450, 1650, 1850, 2050 to remain in the deactivated configuration. For example, the locking device 150, 550, 750, 1050, 1250, 1450, 1650, 1850, 2050 may remain in the deactivated configuration until a signal is sent from the electronic controller 160 to change from the deactivated configuration into the activated configuration. In other embodiments, the electronic controller 160 may send a signal to command the locking device 150, 550, 750, 1050, 1250, 1450, 1650, 1850, 2050 to remain in the deactivated configuration, and to command the locking device 150, 550, 750, 1050, 1250, 1450, 1650, 1850, 2050 to change to the activated configuration, the electronic controller 160 may cease to send a signal to the locking device 150, 550, 750, 1050, 1250, 1450, 1650, 1850, 2050. Alternatively, the electronic controller 160 may send signals to command the locking device 150, 550, 750, 1050, 1250, 1450, 1650, 1850, 2050 to both remain in the deactivated configuration and to change to the activated configuration.

As described above, when the locking devices 150, 550, 750, 1050, 1450, 1650, 1850 are in the activated configuration, the locking devices 150, 550, 750, 1050, 1450, 1650, 1850 restrict translation of the rack 132 in the vehicle lateral direction. By restricting translation of the rack 132 in the vehicle lateral direction, the locking devices 150, 550, 750, 1050, 1450, 1650, 1850 restrict rotation of the front wheel 124 with respect to the unibody 110 of the vehicle 100. Further, by restricting translation of the rack 132, the locking device 150 restricts rotation of the steering wheel 142.

As described above and as shown in FIG. 22, when the locking device 2050 is in the activated configuration, the locking device 2050 restricts rotation of the steering column assembly 140. By restricting rotation of the steering column assembly 140, the locking device 2050 restricts rotation of the front wheel 124 with respect to the unibody 110 of the vehicle 100. Further, by restricting rotation of the steering column assembly 140, the locking device 2050 restricts rotation of the steering wheel 142.

Accordingly, when the electronic controller 160 commands the locking device 150, 550, 750, 1050, 1250, 1450, 1650, 1850, 2050 to change into the activated configuration, the locking device 150, 550, 750, 1050, 1250, 1450, 1650, 1850, 2050 may restrict rotation of the front wheel 124 about the axis 200 with respect to the unibody 110 of the vehicle 100 and may restrict rotation of the steering wheel 142. By moving the locking device 150, 550, 750, 1050, 1250, 1450, 1650, 1850, 2050 into the activated configuration based on the detected rotational speed of the steering wheel 142, the locking device 150, 550, 750, 1050, 1250, 1450, 1650, 1850, 2050 may be changed into the activated configuration during a small front bumper overlap impact.

As described hereinabove, during a small front bumper overlap impact, energy associated with the impact may cause the front wheel 124 to rotate with respect to the unibody 110 of the vehicle. Because the steering column assembly 140 and the steering wheel 142 is coupled to the front wheel 124 through the steering rack assembly 130 and the tie rod 128, when the front wheel 124 rotates, the steering wheel 142 may rotate. During a small front bumper overlap impact, the rotation of the front wheel 124 may cause the steering wheel 142 to rotate at a relatively high rotational speed. In embodiments, the predetermined rotational speed may be selected such that a detected rotational speed of the steering wheel 142 that exceeds the predetermined rotational speed may indicate that the vehicle 100 has impacted a barrier with a small front bumper overlap. For example, in one embodiment, the predetermined rotational speed may be selected to be about 300 rotations per minute (RPM). In another embodiment, the predetermined rotational speed may be selected to be about 350 RPM. In yet another embodiment, the predetermined rotational speed may be selected to be greater than about 300 RPM and less than about 1000 RPM, inclusive of the endpoints.

By restricting rotation of the front wheel 124 during a small front bumper overlap collision, the locking device 150, 550, 750, 1050, 1250, 1450, 1650, 1850, 2050 may assist in maintaining the front wheel 124 near its original longitudinal orientation, as shown in FIG. 1. As described above, by maintaining the front wheel 124 near a longitudinal orientation during a small front bumper overlap impact, less energy associated with the impact may be transferred to the cabin 108 as compared to when the front wheel 124 is permitted to rotate.

Further, by restricting rotation of the steering wheel 142 during a small front bumper overlap impact, the locking device 150, 550, 750, 1050, 1250, 1450, 1650, 1850, 2050 may prevent or restrict rotation of the steering wheel 142. As described above, when the steering wheel 142 rotates at a relatively high rotational speed, the effectiveness of supplemental restraints that are positioned within the steering wheel 142 may decrease. Accordingly, by preventing or restricting rotation of the steering wheel 142 during a small front bumper overlap impact, the locking device 150, 550, 750, 1050, 1250, 1450, 1650, 1850, 2050 may prevent the decrease in effectiveness of the supplemental restraints that are positioned within the steering wheel 142.

Figure 26:
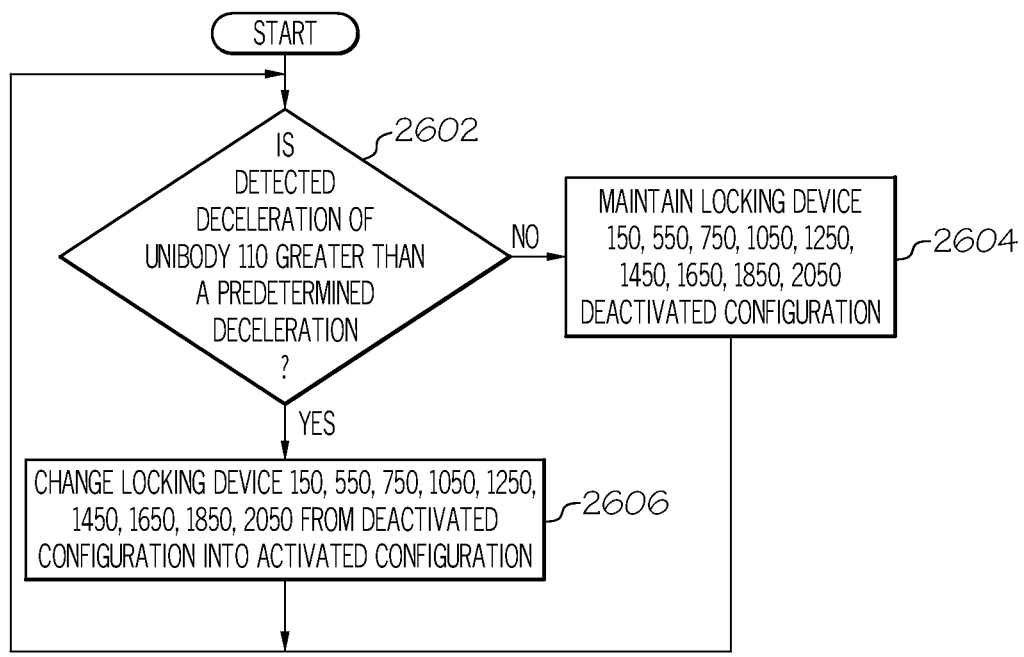
FIG. 26 schematically depicts a logic flowchart of a method of operating a steering system of a vehicle according to one or more embodiments shown or described herein.

Turning now to FIG. 26, another embodiment of a method for operating the steering system 120 is depicted. The locking device 150, 550, 750, 1050, 1250, 1450, 1650, 1850, 2050 is selectively changed between the deactivated configuration that allows operation of the steering system 120 and the activated configuration that restricts operation of the steering system 120 according to the flow chart depicted in FIG. 26. In a first step 2602, the electronic controller 160 receives a signal from the inertial sensor 166 indicating a deceleration of the unibody 110 and compares this detected deceleration to a predetermined deceleration. If the signal received by the electronic controller 160 indicates a detected deceleration that is not greater than the predetermined deceleration, then the electronic controller 160 proceeds to step 2604, where the electronic controller 160 commands the locking device 150, 550, 750, 1050, 1250, 1450, 1650, 1850, 2050 to remain in the deactivated configuration. If the signal received by the electronic controller 160 indicates a detected declaration that is greater than the predetermined deceleration, then the electronic controller 160 proceeds to step 2606. At step 2606, the electronic controller 160 commands the locking device 150, 550, 750, 1050, 1250, 1450, 1650, 1850, 2050 to change from the deactivated configuration into the activated configuration.

It should be understood that the electronic controller 160 may not necessarily send a signal to command the locking device 150, 550, 750, 1050, 1250, 1450, 1650, 1850, 2050 to remain in the deactivated configuration. For example, the locking device 150, 550, 750, 1050, 1250, 1450, 1650, 1850, 2050 may remain in the deactivated configuration until a signal is sent from the electronic controller 160 to change from the deactivated configuration into the activated configuration. In other embodiments, the electronic controller 160 may send a signal to command the locking device 150, 550, 750, 1050, 1250, 1450, 1650, 1850, 2050 to remain in the deactivated configuration, and to command the locking device 150, 550, 750, 1050, 1250, 1450, 1650, 1850, 2050 to change to the activated configuration, the electronic controller 160 may cease to send a signal to the locking device 150, 550, 750, 1050, 1250, 1450, 1650, 1850, 2050. Alternatively, the electronic controller 160 may send signals to command the locking device 150, 550, 750, 1050, 1250, 1450, 1650, 1850, 2050 to both remain in the deactivated configuration and to change to the activated configuration.

As described above, when the locking devices 150, 550, 750, 1050, 1450, 1650, 1850 are in the activated configuration, the locking devices 150, 550, 750, 1050, 1450, 1650, 1850 restrict translation of the rack 132 in the vehicle lateral direction. By restricting translation of the rack 132 in the vehicle lateral direction, the locking devices 150, 550, 750, 1050, 1450, 1650, 1850 restrict rotation of the front wheel 124 with respect to the unibody 110 of the vehicle 100. Further, by restricting translation of the rack 132, the locking device 150 restricts rotation of the steering wheel 142.

As described above and as shown in FIG. 22, when the locking device 2050 is in the activated configuration, the locking device 2050 restricts rotation of the steering column assembly 140. By restricting rotation of the steering column assembly 140, the locking device 2050 restricts rotation of the front wheel 124 with respect to the unibody 110 of the vehicle 100. Further, by restricting rotation of the steering column assembly 140, the locking device 2050 restricts rotation of the steering wheel 142.

Accordingly, when the electronic controller 160 commands the locking device 150, 550, 750 to change into the activated configuration, the locking device 150, 550, 750, 1050, 1250, 1450, 1650, 1850, 2050 may restrict rotation of the front wheel 124 about the axis 200 with respect to the unibody 110 of the vehicle 100 and may restrict rotation of the steering wheel 142. By moving the locking device 150, 550, 750, 1050, 1250, 1450, 1650, 1850, 2050 into the activated configuration based on the detected deceleration of the unibody 110, the locking device 150150, 550, 750, 1050, 1250, 1450, 1650, 1850, 2050 may be changed into the activated configuration during an impact, such as a small front bumper overlap impact. The predetermined deceleration may be selected such that a detected deceleration that exceeds the predetermined deceleration may indicate that the vehicle 100 has impacted a barrier. The predetermined deceleration may be selected to include deceleration values that may indicate an impact to the vehicle 100, as commonly understood in the art.

By restricting rotation of the front wheel 124 during an impact, such as a small front bumper overlap collision, the locking device 150, 550, 750, 1050, 1250, 1450, 1650, 1850, 2050 may assist in maintaining the front wheel 124 near a longitudinal orientation, as shown in FIG. 1. As described above, by maintaining the front wheel 124 near its original longitudinal orientation during a small front bumper overlap impact, less energy associated with the impact may be transferred to the cabin 108 as compared to when the front wheel 124 is permitted to rotate.

Further, by restricting rotation of the steering wheel 142 during an impact, such as a small front bumper overlap impact, the locking device 150, 550, 750, 1050, 1250, 1450, 1650, 1850, 2050 may prevent or restrict rotation of the steering wheel 142. As described above, when the steering wheel 142 rotates at a relatively high rotational speed, the effectiveness of supplemental restraints that are positioned within the steering wheel 142 may decrease. Accordingly, by preventing or restricting rotation of the steering wheel 142 during a small front bumper overlap impact, the locking device 150, 550, 750, 1050, 1250, 1450, 1650, 1850, 2050 may prevent the decrease in effectiveness of the supplemental restraints that are positioned within the steering wheel 142.

Figure 27:
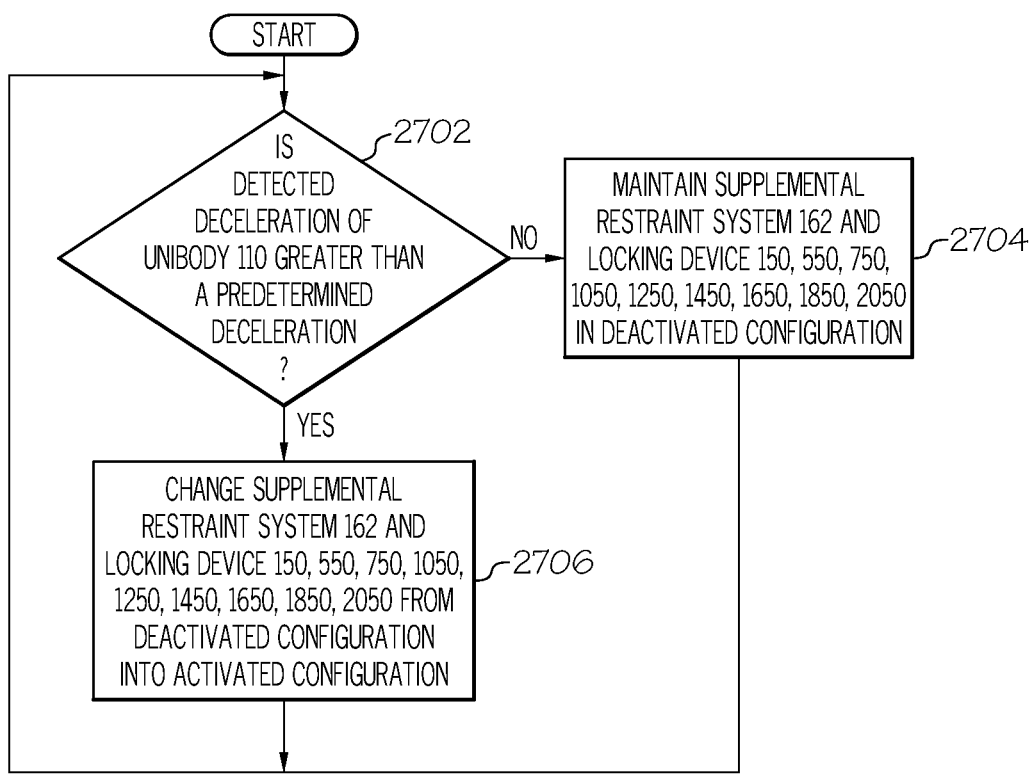
FIG. 27 schematically depicts a logic flowchart of a method of operating a steering system of a vehicle according to one or more embodiments shown or described herein.

Turning now to FIG. 27, another embodiment of a method for operating the steering system 120 is depicted. The locking device 150, 550, 750, 1050, 1250, 1450, 1650, 1850, 2050 and the supplemental restraint system 162 are selectively changed between the deactivated configuration and the activated configuration according to the flow chart depicted in FIG. 27. In a first step 2702, the electronic controller 160 receives a signal from the inertial sensor 166 indicating a deceleration of the unibody 110 and compares this detected deceleration to a predetermined deceleration. If the signal received by the electronic controller 160 indicates a detected deceleration that is not greater than the predetermined deceleration, then the electronic controller 160 proceeds to step 2704, where the electronic controller 160 commands the locking device 150, 550, 750, 1050, 1250, 1450, 1650, 1850, 2050 and the supplemental restraint system 162 to remain in their deactivated configurations. If the signal received by the electronic controller 160 indicates a detected declaration that is greater than the predetermined deceleration, then the electronic controller 160 proceeds to step 2706. At step 2706, the electronic controller 160 commands the locking device 150, 550, 750, 1050, 1250, 1450, 1650, 1850, 2050 and the supplemental restraint system 162 to change from the deactivated configuration into the activated configuration.

In the embodiment of the method for operating the steering system depicted in the flow chart of FIG. 27, the step of commanding the locking device 150, 550, 750, 1050, 1250, 1450, 1650, 1850, 2050 to change into the activated configuration (i.e., step 2706) is performed simultaneously as the step of commanding the supplemental restraint system 162 to change into the activated configuration (i.e., step 2706). However, it should be understand that these steps may be performed in any order (i.e., the locking device 150, 550, 750, 1050, 1250, 1450, 1650, 1850, 2050 may be changed into the activated configuration before or after the supplemental restraint system 162 is changed into the activated configuration).

It should be understood that the electronic controller 160 may not necessarily send a signal to command the locking device 150, 550, 750, 1050, 1250, 1450, 1650, 1850, 2050 to remain in the deactivated configuration. For example, the locking device 150, 550, 750, 1050, 1250, 1450, 1650, 1850, 2050 may remain in the deactivated configuration until a signal is sent from the electronic controller 160 to change from the deactivated configuration into the activated configuration. In other embodiments, the electronic controller 160 may send a signal to command the locking device 150, 550, 750, 1050, 1250, 1450, 1650, 1850, 2050 to remain in the deactivated configuration, and to command the locking device 150, 550, 750, 1050, 1250, 1450, 1650, 1850, 2050 to change to the activated configuration, the electronic controller 160 may cease to send a signal to the locking device 150, 550, 750, 1050, 1250, 1450, 1650, 1850, 2050. Alternatively, the electronic controller 160 may send signals to command the locking device 150, 550, 750, 1050, 1250, 1450, 1650, 1850, 2050 to both remain in the deactivated configuration and to change to the activated configuration.

As described above, when the locking devices 150, 550, 750, 1050, 1450, 1650, 1850 are in the activated configuration, the locking devices 150, 550, 750, 1050, 1450, 1650, 1850 restrict translation of the rack 132 in the vehicle lateral direction. By restricting translation of the rack 132 in the vehicle lateral direction, the locking devices 150, 550, 750, 1050, 1450, 1650, 1850 restrict rotation of the front wheel 124 with respect to the unibody 110 of the vehicle 100. Further, by restricting translation of the rack 132, the locking device 150 restricts rotation of the steering wheel 142.

As described above and as shown in FIG. 22, when the locking device 2050 is in the activated configuration, the locking device 2050 restricts rotation of the steering column assembly 140. By restricting rotation of the steering column assembly 140, the locking device 2050 restricts rotation of the front wheel 124 with respect to the unibody 110 of the vehicle 100. Further, by restricting rotation of the steering column assembly 140, the locking device 2050 restricts rotation of the steering wheel 142.

Accordingly, when the electronic controller 160 commands the locking device 150, 550, 750, 1050, 1250, 1450, 1650, 1850, 2050 to change into the activated configuration, the locking device 150, 550, 750, 1050, 1250, 1450, 1650, 1850, 2050 may restrict rotation of the front wheel 124 about the axis 200 with respect to the unibody 110 of the vehicle 100 and may restrict rotation of the steering wheel 142. By moving the locking device 150, 550, 750, 1050, 1250, 1450, 1650, 1850, 2050 into the activated configuration based on the detected deceleration of the unibody 110, the locking device 150, 550, 750, 1050, 1250, 1450, 1650, 1850, 2050 may be changed into the activated configuration during an impact, such as a small front bumper overlap impact. The predetermined deceleration may be selected such that a detected deceleration that exceeds the predetermined deceleration may indicate that the vehicle 100 has impacted a barrier. The predetermined deceleration may be selected to include deceleration values that may indicate an impact to the vehicle 100, as commonly understood in the art.

By restricting rotation of the front wheel 124 during an impact, such as a small front bumper overlap collision, the locking device 150, 550, 750, 1050, 1250, 1450, 1650, 1850, 2050 may assist in maintaining the front wheel 124 near its original longitudinal orientation, as shown in FIG. 1. As described above, by maintaining the front wheel 124 near a longitudinal orientation during a small front bumper overlap impact, less energy associated with the impact may be transferred to the cabin 108 as compared to when the front wheel 124 is permitted to rotate.

Further, by restricting rotation of the steering wheel 142 during an impact, such as a small front bumper overlap impact, the locking device 150, 550, 750, 1050, 1250, 1450, 1650, 1850, 2050 may prevent or restrict rotation of the steering wheel 142. As described above, when the steering wheel 142 rotates at a relatively high rotational speed, the effectiveness of supplemental restraints that are positioned within the steering wheel 142 may decrease. Accordingly, by preventing or restricting rotation of the steering wheel 142 during a small front bumper overlap impact, the locking device 150, 550, 750, 1050, 1250, 1450, 1650, 1850, 2050 may prevent the decrease in effectiveness of the supplemental restraints that are positioned within the steering wheel 142.

It should now be understood that vehicles and vehicle systems according to the present specification include a front wheel, a steering rack assembly that includes a rack that is coupled to the front wheel, and a locking device that may change between a deactivated configuration that allows translation of the rack and an activated configuration that restricts translation of the rack. In some embodiments, the locking device is coupled to the steering rack assembly and at least a portion of the locking device is detached from a rack of the steering rack assembly in the deactivated configuration and is engaged with the rack in the activated configuration. In other embodiments, a rotational sensor is coupled to a steering column assembly and an inertial sensor is coupled to a unibody of the vehicle, and an electronic controller commands the locking device to change from the deactivated configuration into the activated configuration based on at least one of a detected rotational speed of the steering column and a detected deceleration of the unibody of the vehicle. In some other embodiments, the locking device is coupled to a steering column assembly of the vehicle, wherein and at least a portion of the locking device is detached from the steering column assembly in the deactivated configuration and is engaged with the steering column assembly in the activated configuration. By moving the locking device to engage the rack and the steering column assembly, the locking device may restrict and/or prevent rotation of the front wheel and a steering wheel that is coupled to the front wheel during an impact, such as a small front bumper overlap impact. By restricting and/or preventing rotation of the front wheel and the steering wheel, the locking device may reduce the amount of energy associated with the impact that is directed into a cabin of the vehicle and may maintain the performance of supplemental restraints that are positioned within the steering wheel.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a front wheel; a steering rack assembly that comprises a rack coupled to the front wheel, wherein the rack extends in a vehicle lateral direction and is translatable with respect to a unibody of the vehicle in the vehicle lateral direction;
   a locking device coupled to the steering rack assembly, wherein the locking device comprises a deactivated configuration that allows translation of the rack and an activated configuration that restricts translation of the rack; and
   an electronic controller communicatively coupled to a rotational sensor and the locking device, wherein the electronic controller commands the locking device to change from the deactivated configuration to the activated configuration based on output from the rotational sensor that is indicative of rotational speed of at least one of a steering column assembly and a steering wheel;
   wherein the electronic controller is configured to command the locking device to change from the deactivated configuration to the activated configuration when a predetermined rotational speed of no less than 300 RPM is detected using the rotational sensor.

2. The vehicle of claim 1, wherein the rack comprises a plurality of teeth and the locking device interlocks with at least one of the plurality of teeth in the activated configuration.

3. The vehicle of claim 2, wherein the locking device comprises at least one blocking element comprising a projection that is spaced apart from the rack in the deactivated configuration.

4. The vehicle of claim 3, wherein the projection of the at least one blocking element extends in a direction that is transverse to the plurality of teeth of the rack.

5. The vehicle of claim 1, wherein the locking device comprises a pad that engages a lateral face of the rack in the activated configuration.

6. The vehicle of claim 5, wherein the locking device comprises a stationary portion that is coupled to the pad.

7. The vehicle of claim 6, wherein the locking device comprises at least one arm that is coupled to the pad and is pivotally coupled to the stationary portion.

8. The vehicle of claim 1, wherein the rack comprises an engagement feature having an engagement face, and wherein the locking device comprises a pad that engages the engagement face in the activated configuration.

9. The vehicle of claim 1, wherein the locking device comprises a stationary portion and a wedge portion, wherein the wedge portion contacts and engages a lateral face of the rack in the activated configuration.

10. A vehicle system of a vehicle, the vehicle system comprising:
    a front wheel;
    a steering system comprising:
      a steering rack assembly that comprises a rack coupled to the front wheel, wherein the rack extends in a vehicle lateral direction and is translatable with respect to a unibody of the vehicle in the vehicle lateral direction;
      a steering column assembly coupled to the steering rack assembly, the steering column assembly comprising a pinion gear that is engaged with the rack of the steering rack assembly; and
      a steering wheel coupled to the steering column assembly;
    a rotational sensor coupled to at least one of the steering column assembly and the steering wheel;
    a locking device coupled to the steering system, wherein the locking device comprises a deactivated configuration that allows operation of the steering system and an activated configuration that restricts operation of the steering system; and an electronic controller communicatively coupled to the rotational sensor and the locking device, the electronic controller comprising a processor and a memory storing a computer readable and executable instruction set, wherein, when the computer readable and executable instruction set is executed by the processor, the electronic controller:

detects a rotational speed of at least one of the of the steering column assembly and the steering wheel with the rotational sensor; and commands the locking device to change into the activated configuration based on the detected rotational speed of at least one of the steering column assembly and the steering wheel;

wherein the electronic controller commands the locking device to change into the activated configuration when the detected rotational speed is no less than 300 RPM.

11. The vehicle system of claim 10, wherein a motor is coupled to the steering column assembly and the motor comprises the rotational sensor.

12. The vehicle system of claim 10, wherein the locking device is coupled to the steering rack assembly.

13. The vehicle system of claim 12, wherein at least a portion of the locking device is detached from the rack in the deactivated configuration and is engaged with the rack in the activated configuration.

14. The vehicle system of claim 13, wherein at least a portion of the locking device interlocks with at least one of a plurality of teeth of the rack in the activated configuration.

15. The vehicle system of claim 10, wherein the locking device is coupled to the steering column assembly.

16. The vehicle system of claim 15, wherein at least a portion of the locking device is detached from the steering column assembly in the deactivated configuration and is engaged with the steering column assembly in the activated configuration.

17. A method for operating a steering system comprising:

detecting at least one of rotational speed of a steering column assembly and a deceleration of a unibody of a vehicle;

changing a locking device from a deactivated configuration to an activated configuration based on at least one of the detected rotational speed and the detected deceleration of the unibody; and engaging a rack of the steering system with the locking device in the activated configuration;

wherein the step of changing the locking device from the deactivated configuration to the activated configuration occurs if the detected rotational speed is greater than a predetermined rotational speed of no less than 300 RPM.

18. The method of claim 17, wherein engaging the rack comprises interlocking with at least one of a plurality of teeth of the rack.

19. The method of claim 17, wherein engaging the rack comprises engaging a lateral face of the rack.

20. The method of claim 17, wherein engaging the rack comprises engaging an engagement face of the rack.

* * * * *